(12) United States Patent
Peng et al.

(10) Patent No.: US 11,736,954 B2
(45) Date of Patent: Aug. 22, 2023

(54) CAPACITY PLANNING METHOD AND APPARATUS

(71) Applicant: HUAWEI TECHNOLOGIES CO., LTD., Guangdong (CN)

(72) Inventors: Xi Peng, Shenzhen (CN); Bo Bai, Hong Kong (CN); Gong Zhang, Shenzhen (CN); Yu Lan, Shenzhen (CN); Haofeng Qi, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 17/321,104

(22) Filed: May 14, 2021

(65) Prior Publication Data
US 2021/0274359 A1 Sep. 2, 2021

Related U.S. Application Data

(63) Continuation of application No. PCT/CN2019/116670, filed on Nov. 8, 2019.

(30) Foreign Application Priority Data

Nov. 16, 2018 (CN) .......................... 201811367720.6

(51) Int. Cl.
H04W 16/22 (2009.01)
H04W 28/08 (2023.01)
H04W 28/20 (2009.01)

(52) U.S. Cl.
CPC ......... *H04W 16/22* (2013.01); *H04W 28/095* (2020.05); *H04W 28/0983* (2020.05); *H04W 28/20* (2013.01)

(58) Field of Classification Search
CPC ... H04W 16/18–225; H04W 24/00–10; H04W 28/00–14
See application file for complete search history.

(56) References Cited

U.S. PATENT DOCUMENTS

2003/0099221 A1 5/2003 Rhee
2015/0208260 A1* 7/2015 Ahlqvist ............... H04L 1/0003
370/252

(Continued)

FOREIGN PATENT DOCUMENTS

| CN | 101286897 A | 10/2008 |
| CN | 101753381 A | 6/2010 |
| CN | 102098135 A | 6/2011 |
| CN | 103152749 A | 6/2013 |

(Continued)

OTHER PUBLICATIONS

3GPP TS 36.314 V15.1.0 (Jul. 2018), "3rd Generation Partnership Project; Technical Specification Group Radio Access Network;Evolved Universal Terrestrial Radio Access (E-UTRA); Layer 2—Measurements(Release 15)"Jul. 2018, 28 pages.

(Continued)

*Primary Examiner* — Ronald Eisner
(74) *Attorney, Agent, or Firm* — Fish & Richardson P.C.

(57) ABSTRACT

The present disclosure relates to capacity planning methods and apparatus. One example method includes matching a distribution model based on a quantity of service packets in each transmission time interval within specified duration to obtain a matched first distribution model, matching a distribution model based on a length of the service packets to obtain a second distribution model, and performing bandwidth control based on the first distribution model, the second distribution model, a distribution parameter of the first distribution model, and a distribution parameter of the second distribution model.

12 Claims, 4 Drawing Sheets

(56) References Cited

U.S. PATENT DOCUMENTS

| | | | |
|---|---|---|---|
| 2015/0236957 A1 | 8/2015 | Albanese et al. | |
| 2015/0341235 A1* | 11/2015 | Ni | H04W 24/00 370/392 |
| 2016/0050571 A1 | 2/2016 | Zhuang et al. | |

FOREIGN PATENT DOCUMENTS

| | | |
|---|---|---|
| CN | 103632209 A | 3/2014 |
| CN | 108093411 A | 5/2018 |
| EP | 2863674 A1 | 4/2015 |
| WO | 2007032733 A2 | 3/2007 |

OTHER PUBLICATIONS

Office Action issued in Chinese Application No. 201811367720.6 dated Mar. 8, 2021, 12 pages (with English translation).

PCT International Search Report and Written Opinion issued in International Application No. PCT/CN2019/116670 dated Jan. 23, 2020, 13 pages (with English translation).

Daigle, "Queuing Theory With Applications To Packet Telecommuniciation," Springer Science + Business Media, Inc., Jan. 2004, 50 pages.

Extended European Search Report issued in European Application No. 19885672.6 dated Jan. 7, 2022, 9 pages.

Fawaz et al., "A Queue-Aware Discrete Scheduling Simulator for Full-Duplex OFDMA Wireless Networks," 2018 IEEE International Conference on Computer and Applications (ICCA), Aug. 25, 2018, 6 pages.

Le Boudec, "Performance Evaluation of Computer and Communication Systems," Chapter 3, CRC Press LLC, Jan. 2011, 40 pages.

Peng et al., "Bit-Level Power-Law Queuing Theory with Applications in LTE Networks," 2018 IEEE Global Communications Conference (GLOBECOM), Dec. 9, 2018, 6 pages.

* cited by examiner

CAPACITY PLANNING METHOD AND APPARATUS

CROSS-REFERENCE TO RELATED APPLICATIONS

This application is a continuation of International Application No. PCT/CN2019/116670, filed on Nov. 8, 2019, which claims priority to Chinese Patent Application No. 201811367720.6, filed on Nov. 16, 2018. The disclosures of the aforementioned applications are hereby incorporated by reference in their entireties.

TECHNICAL FIELD

This application relates to the field of mobile communications technologies, and in particular, to a capacity planning method and apparatus.

BACKGROUND

In 2014, European Telecommunications Standards Institute (The European Telecommunications Standards Institute, ETSI) proposed mobile edge computing (Mobile Edge Computing, MEC) as a future network architecture solution, in which an information technology (Information Technology, IT) service environment and a computing capability are provided at an edge of a Long Term Evolution (Long Term Evolution, LIE) and a 5th generation (5th generation, 5G) mobile network (for example, a base station), to deploy a network service on a radio access side closer to a user, thereby reducing operating pressure on a core network and enabling a network operator to improve user experience.

MEC is implemented based on proper network capacity planning. A key step is to properly predict network traffic, to ensure user experience and control operating costs. This is not only a research hotspot in academia, but also an urgent problem that needs to be resolved in industry. With popularization of intelligent devices and development of various network applications, network services become increasingly complex, gradually changing from being mainly voice services to being mainly data services such as video and interactive entertainment. Statistical data of a live network shows that a traffic volume of the live network is significantly bursty. Therefore, "an average effect" of a traditional voice network is not applicable. A new network service model is required to describe the traffic volume. Traditional average performance counters cannot reflect actual network performance. The statistical data of the live network shows that the average performance counters (for example, hourly average) often mask resource insufficiency and poor user experience during busy hours. Therefore, new measurement counters need to be introduced to directly reflect a user experienced rate and accurately plan a user capacity.

SUMMARY

This application provides a capacity planning method and apparatus, to improve capacity planning accuracy of a user.

According to a first aspect, this application provides a capacity planning method, including: receiving, by a capacity planning apparatus, a distribution parameter value of a first distribution model and a distribution parameter value of a second distribution model from a service measurement apparatus, where the first distribution model and the second distribution model are respectively a distribution model matching a quantity of service packets in each transmission time interval within specified duration and a distribution model matching a length of the service packet that are obtained by the service measurement apparatus; and performing, by the capacity planning apparatus, bandwidth control based on the first distribution model, the second distribution model, the distribution parameter value of the first distribution model, and the distribution parameter value of the second distribution model. Based on this solution, the distribution model is matched based on the quantity of service packets in each transmission time interval within the specified duration, to obtain the matched first distribution model, the distribution model is matched based on the length of the service packet, to obtain the second distribution model, and the bandwidth control is performed based on the first distribution model, the second distribution model, a distribution parameter of the first distribution model, and a distribution parameter of the second distribution model. Because bandwidth control is performed based on a matched distribution model and a distribution parameter of a distribution model, it helps provide more accurate capacity planning for a user.

In a possible implementation method, the capacity planning apparatus determines a user experienced rate distribution model based on the first distribution model, the second distribution model, a downlink transmission rate of a base station, and the transmission time interval. The capacity planning apparatus performs bandwidth control based on the user experienced rate distribution model, the distribution parameter value of the first distribution model, the distribution parameter value of the second distribution model, and a quality of service requirement parameter value. Based on this solution, the user experienced rate distribution model is introduced, and the user experienced rate distribution model is determined based on the first distribution model matching the quantity of service packets in each transmission time interval within the specified duration, the second distribution model matching the length of the service packet, the downlink transmission rate of the base station, and a length of the time interval. Because a distribution model of a quantity of service packets at a transmission time interval granularity and a distribution model of a length of the service packet are used, and the length of the service packet is in a unit of bit, in this solution, a distribution model of a total quantity of bits of a service in each transmission time interval may be obtained. In this way, a finer bit-level granularity is provided. Therefore, the determined user experienced rate distribution model can more accurately describe a user experienced rate, thereby providing more accurate capacity planning for a user.

In a possible implementation, when the service measurement apparatus is deployed on a terminal, and the capacity planning apparatus is deployed on the base station, the downlink transmission rate of the base station is a downlink transmission rate of the base station for the terminal.

In a possible implementation, when the service measurement apparatus is deployed on the base station, and the capacity planning apparatus is deployed on a mobile edge computing server, the downlink transmission rate of the base station is a sum of downlink transmission rates of the base station for all terminals accessing the base station.

In a possible implementation method, the quality of service requirement parameter value is preset bandwidth utilization; and the performing, by the capacity planning apparatus, bandwidth control based on the user experienced rate distribution model, the distribution parameter value of the first distribution model, the distribution parameter value of the second distribution model, and a quality of service requirement parameter value includes: determining, by the capacity planning apparatus, a busy-hour average user experienced rate value based on the user experienced rate distribution model, the distribution parameter value of the first distribution model, the distribution parameter value of the second distribution model, and the preset bandwidth utilization; and performing, by the capacity planning apparatus, bandwidth control based on the busy-hour average user experienced rate value. Based on this solution, the busy-hour average user experienced rate value is introduced. Therefore, a busy-hour user experienced rate can be more precisely described based on this parameter, thereby providing more accurate capacity planning for a user.

In a possible implementation method, the first distribution model is a Zeta distribution model, a distribution model parameter of the first distribution model includes s, the second distribution model is a Pareto distribution model, and distribution model parameters of the second distribution model include n and a.

The user experienced rate distribution model is as follows:

$$Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$

where Pr( ) is the user experienced rate distribution model, x is an independent variable of a user experienced rate. $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, r is the transmission time interval, $\zeta(\ )$ is a Riemann function, E[S] is an expected value of a quantity of bits that arrive within one transmission time interval, and $p_0$ is a probability that a quantity of service packets that arrive is zero.

The capacity planning apparatus determines the busy-hour average user experienced rate value according to the following formula:

$$\bar{R}_{busy} = \frac{\left(R\tau - \frac{\zeta(s-1)}{\zeta(s)}m + m\right)^{2-\alpha} - \left(m - \frac{\zeta(s-1)}{\zeta(s)}m\right)^{2-\alpha}}{\tau(2-\alpha)\left(\varepsilon R\tau - \frac{\zeta(s-1)}{\zeta(s)}m + m\right)^{-\alpha+1}},$$

where $\bar{R}_{busy}$ is the busy-hour average user experienced rate value, c is the preset bandwidth utilization, and $0 \leq \varepsilon \leq 1$.

In a possible implementation method, the performing, by the capacity planning apparatus, bandwidth control based on the busy-hour average user experienced rate value includes: increasing a bandwidth if a difference between the busy-hour average user experienced rate value and the downlink transmission rate of the base station is greater than a first difference threshold; or reducing a bandwidth if a difference between the busy-hour average user experienced rate value and the downlink transmission rate of the base station is less than a second difference threshold.

In still another possible implementation method, the quality of service parameter value is a preset user experienced rate satisfaction degree; and the performing, by the capacity planning apparatus, bandwidth control based on the user experienced rate distribution model, the distribution parameter value of the first distribution model, the distribution parameter value of the second distribution model, and a quality of service parameter value includes: determining, by the capacity planning apparatus, a lower limit value of the user experienced rate based on the user experienced rate distribution model, the distribution parameter value of the first distribution model, the distribution parameter value of the second distribution model, and the preset user experienced rate satisfaction degree; and performing, by the capacity planning apparatus, bandwidth control based on the lower limit value of the user experienced rate. Based on this solution, the lower limit value of the user experienced rate is introduced. Therefore, the user experienced rate can be more precisely described based on this parameter, thereby helping provide more accurate capacity planning for a user.

In a possible implementation method, the first distribution model is a Zeta distribution model, a distribution model parameter of the first distribution model includes s, the second distribution model is a Pareto distribution model, and distribution model parameters of the second distribution model include m and a.

The user experienced rate distribution model is as follows:

$$Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$

where Pr( ) is the user experienced rate distribution model, x is an independent variable of the user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, r is the transmission time interval, $\zeta(\ )$ is a Riemann function, E[S] is an expected value of a quantity of bits that arrive within one transmission time interval, and $p_0$ is a probability that a quantity of service packets that arrive is zero.

The capacity planning apparatus determines the lower limit value of the user experienced rate according to the following formula:

$$\frac{(1-p_0)\zeta(s-1)m^\alpha}{(R\tau - E[S])\zeta(s)(\alpha-1)}\left(\tau R_{min} - \frac{\zeta(s-1)}{\zeta(s)}m + m\right)^{-\alpha+1} = \eta,$$

where $R_{min}$ is the lower limit value of the user experienced rate, and η is the preset user experienced rate satisfaction degree.

In a possible implementation method, the performing, by the capacity planning apparatus, bandwidth control based on the lower limit value of the user experienced rate includes: increasing a bandwidth if a difference between the lower limit value of the user experienced rate and the downlink transmission rate of the base station is greater than a third difference threshold; or reducing a bandwidth if a difference between the busy-hour average user experienced rate value and the downlink transmission rate of the base station is less than a fourth difference threshold.

In a possible implementation method, the capacity planning apparatus further receives identification information of the first distribution model and identification information of the second distribution model from the service measurement apparatus, where the identification information of the first distribution model is used to identify the selected first distribution model, and the identification information of the second distribution model is used to identify the selected second distribution model.

In still another possible implementation method, the capacity planning apparatus further receives identification information of a service arrival model from the service measurement apparatus, where the identification information of the service arrival model is used to identify a service arrival model corresponding to the selected first distribution model and the selected second distribution model. The capacity planning apparatus determines the selected first distribution model and the selected second distribution model based on the identification information of the service arrival model.

According to a second aspect, this application provides a capacity planning method, where the method includes: obtaining, by a service measurement apparatus, a quantity of service packets in each transmission time interval within specified duration and a length of the service packet; determining, by the service measurement apparatus, a distribution parameter value of a first distribution model matching the quantity of service packets, and determining a distribution parameter value of a second distribution model matching the length of the service packet; and sending, by the service measurement apparatus, the distribution parameter value of the first distribution model and the distribution parameter value of the second distribution model to a capacity planning apparatus, where the first distribution model, the second distribution model, a downlink transmission rate of a base station, and the transmission time interval are used to determine a user experienced rate distribution model. Further, the user experienced rate distribution model, a parameter value of the first distribution model, a parameter value of the second distribution model, and a quality of service requirement parameter value may be used to perform bandwidth control. In this solution, the user experienced rate distribution model is introduced, and the user experienced rate distribution model is determined based on the first distribution model matching the quantity of service packets in each transmission time interval within the specified duration, the second distribution model matching the length of the service packet, the downlink transmission rate of the base station, and a length of the time interval. Because a distribution model of a quantity of service packets at a transmission time interval granularity and a distribution model of a length of the service packet are used, and the length of the service packet is in a unit of bit, in this solution, a distribution model of a total quantity of bits of a service in each transmission time interval may be obtained. In this way, a finer bit-level granularity is provided. Therefore, the determined user experienced rate distribution model can more accurately describe a user experienced rate, thereby providing more accurate capacity planning for a user.

In a possible implementation method, the determining, by the service measurement apparatus, a distribution parameter value of a first distribution model matching the quantity of service packets includes: fitting, by the service measurement apparatus, at least two distribution models by using the quantity of service packets, to obtain a fitting degree of each distribution model and a distribution parameter value of the distribution model; and determining, by the service measurement apparatus, a distribution model with a highest fitting degree as the first distribution model matching the quantity of service packets, and determining a distribution parameter value of the distribution model with the highest fitting degree as the distribution parameter value of the first distribution model.

Optionally, the at least two distribution models include one or more of the following distribution models: a Poisson distribution model and a Zeta distribution model.

For example, in a specific implementation, the service measurement apparatus fits the Poisson distribution model by using the quantity of service packets, to obtain a first fitting degree and a distribution parameter value of the Poisson distribution model. The service measurement apparatus fits the Zeta distribution model by using the quantity of service packets, to obtain a second fitting degree and a distribution parameter value of the Zeta distribution model. If the first fitting degree is greater than the second fitting degree, the service measurement apparatus determines that a distribution model parameter of the Poisson distribution model is the distribution parameter value of the first distribution model matching the quantity of service packets, where the first distribution model is the Poisson distribution model. Alternatively, if the first fitting degree is not greater than the second fitting degree, the service measurement apparatus determines that the distribution parameter value of the Zeta distribution model is the distribution parameter value of the first distribution model matching the quantity of service packets, where the first distribution model is the Zeta distribution model. The Zeta distribution model is a heavy-tailed distribution model, and can accurately reflect burst service traffic of a user.

In a possible implementation method, the determining, by the service measurement apparatus, a distribution parameter value of a second distribution model matching the length of the service packet includes: fitting, by the service measurement apparatus, at least two distribution models by using the length of the service packet, to obtain a fitting degree of each distribution model and a distribution parameter value of the distribution model; and determining, by the service measurement apparatus, a distribution model with a highest fitting degree as the second distribution model matching the length of the service packet, and determining a distribution parameter value of the distribution model with the highest fitting degree as the distribution parameter value of the second distribution model.

Optionally, the at least two distribution models include one or more of the following distribution models: an exponential distribution model and a Pareto distribution model.

For example, in a specific implementation, the service measurement apparatus fits the exponential distribution model by using the length of the service packet, to obtain a third fitting degree and a distribution parameter value of the exponential distribution model. The service measurement apparatus fits the Pareto distribution model by using the length of the service packet, to obtain a fourth fitting degree and a distribution parameter value of the Pareto distribution model. If the third fitting degree is greater than the fourth fitting degree, the service measurement apparatus determines that the distribution parameter value of the exponential distribution model is the distribution parameter value of the second distribution model matching the length of the service packet, where the second distribution model is the exponential distribution model. Alternatively, if the third fitting degree is not greater than the fourth fitting degree, the service measurement apparatus determines that a distribution model parameter of the Pareto distribution model is a distribution model parameter of the second distribution model matching the length of the service packet, where the second distribution model is the Pareto distribution model. The Pareto distribution model is a heavy-tailed distribution model, and can accurately reflect burst service traffic of a user.

In still another possible implementation method, the determining, by the service measurement apparatus, a distribution parameter value of a first distribution model matching the quantity of service packets includes: fitting, by the service measurement apparatus, a first preset distribution model, to obtain a distribution parameter value of the first preset distribution model; and determining, by the service measurement apparatus, the first preset distribution model as the first distribution model matching the quantity of service packets, and determining the distribution parameter value of the first preset distribution model as the distribution parameter value of the first distribution model. The determining, by the service measurement apparatus, a distribution parameter value of a second distribution model matching the length of the service packet includes: fitting, by the service measurement apparatus, a second preset distribution model, to obtain a distribution parameter value of the second preset distribution model; and determining, by the service measurement apparatus, the second preset distribution model as the second distribution model matching the length of the service packet, and determining that the distribution parameter value of the second preset distribution model as the distribution parameter value of the second distribution model.

Optionally, the first preset distribution model is a Poisson distribution model or a Zeta distribution model, and the second preset distribution model is an exponential distribution model or a Pareto distribution model.

In a possible implementation method, the sending, by the service measurement apparatus, the distribution parameter value of the first distribution model and the distribution parameter value of the second distribution model to a capacity planning apparatus includes: sending, by the service measurement apparatus, a first report message to the capacity planning apparatus, where the first report message includes an identifier of the first distribution model and an identifier of the second distribution model; receiving, by the service measurement apparatus, a first response message for the first report message from the capacity planning apparatus; and sending, by the service measurement apparatus, a second report message to the capacity planning apparatus, where the second report message includes the distribution parameter value of the first distribution model and the distribution parameter value of the second distribution model.

In a possible implementation method, the service measurement apparatus receives a first notification message from the capacity planning apparatus, where the first notification message includes a bandwidth control policy. The service measurement apparatus sends a first acknowledgment message for the first notification message to the capacity planning apparatus. The service measurement apparatus receives a second notification message from the capacity planning apparatus, where the second notification message includes a bandwidth value. The service measurement apparatus performs bandwidth control based on the bandwidth value.

In a possible implementation method, the service measurement apparatus is deployed on a terminal, and the capacity planning apparatus is deployed on the base station. The obtaining, by a service measurement apparatus, a quantity of service packets in each transmission time interval within specified duration and a length of the service packet includes: obtaining, by the service measurement apparatus, the quantity of service packets of the terminal in each transmission time interval within the specified duration and the length of the service packet of the terminal.

In still another possible implementation method, the service measurement apparatus is deployed on the base station, and the capacity planning apparatus is deployed on a mobile edge computing server. The obtaining, by a service measurement apparatus, a quantity of service packets in each transmission time interval within specified duration and a length of a service packet includes: obtaining, by the service measurement apparatus, a quantity of service packets of each terminal that access the base station in each transmission time interval within the specified duration and a length of the service packet of each terminal; or obtaining, by the service measurement apparatus, a quantity of service packets of the base station in each transmission time interval within the specified duration and a length of the service packet of the base station.

In a possible implementation method, the obtaining, by a service measurement apparatus, a quantity of service packets in each transmission time interval within specified duration and a length of the service packet includes: periodically obtaining, by the service measurement apparatus, the quantity of service packets in each transmission time interval within the specified duration and the length of the service packet; or periodically obtaining, by the service measurement apparatus, a quantity of service packets that are in each transmission time interval that meets a preset busy-hour condition and that are within specified duration and a length of the service packet.

According to a third aspect, this application provides a communications apparatus. The communications apparatus has a function of implementing the service measurement apparatus or the capacity planning apparatus in the foregoing method embodiments. The function may be implemented by hardware, or by hardware executing corresponding software. The hardware or software includes one or more units or modules corresponding to the foregoing function.

In a possible design, the communications apparatus includes a processor, a memory, a bus, and a communications interface. The memory stores a computer executable instruction, the processor is connected to the memory by using the bus, and when the communications apparatus runs, the processor executes the computer executable instruction stored in the memory, so that the communications apparatus performs the capacity planning method according to any one of the first aspect or the implementations of the first aspect. For example, the communications apparatus may be a capacity planning apparatus.

In another possible design, the communications apparatus may alternatively be a chip, for example, a chip used for a service measurement apparatus, or a chip used for a capacity planning apparatus. The chip includes a processing unit, and optionally further includes a storage unit. The chip may be configured to perform the capacity planning method in the capacity planning method according to any one of the first aspect or the implementations of the first aspect.

According to a fourth aspect, this application provides a communications apparatus. The communications apparatus has a function of implementing the service measurement apparatus or the capacity planning apparatus in the foregoing method embodiments. The function may be implemented by hardware or by hardware executing corresponding software. The hardware or software includes one or more units or modules corresponding to the foregoing function.

In a possible design, the communications apparatus includes a processor, a memory, a bus, and a communications interface. The memory stores a computer executable instruction, the processor is connected to the memory by using the bus, and when the communications apparatus runs, the processor executes the computer executable instruction stored in the memory, so that the communications apparatus performs the capacity planning method according to any one of the second aspect or the implementations of the second aspect. For example, the communications apparatus may be a service measurement apparatus.

In another possible design, the communications apparatus may alternatively be a chip, for example, a chip used for a service measurement apparatus, or a chip used for a capacity planning apparatus. The chip includes a processing unit, and optionally further includes a storage unit. The chip may be configured to perform the capacity planning method in the capacity planning method according to any one of the second aspect or the implementations of the second aspect.

According to a fifth aspect, this application provides a computer storage medium, storing computer software instructions used by the foregoing terminal. The computer software instructions include programs designed for executing any one of the first aspect or the implementations of the first aspect.

According to a sixth aspect, this application provides a computer storage medium, storing computer software instructions used by the foregoing terminal. The computer software instructions include programs designed for executing any one of the first aspect or the implementations of the first aspect.

According to a seventh aspect, this application provides a computer program product. The computer program product includes a computer software instruction. The computer software instruction may be loaded by using a processor, to implement a procedure in the capacity planning method according to any one of the first aspect or the items of the first aspect.

According to an eighth aspect, this application provides a computer program product. The computer program product includes a computer software instruction. The computer software instruction may be loaded by using a processor, to implement a procedure in the capacity planning method according to any one of the second aspect or the items of the second aspect.

According to a ninth aspect, this application provides a system, including the service measurement apparatus according to any one of the foregoing aspects and the capacity planning apparatus according to any one of the foregoing aspects.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "plurality of" means two or more than two.

Figure 1:
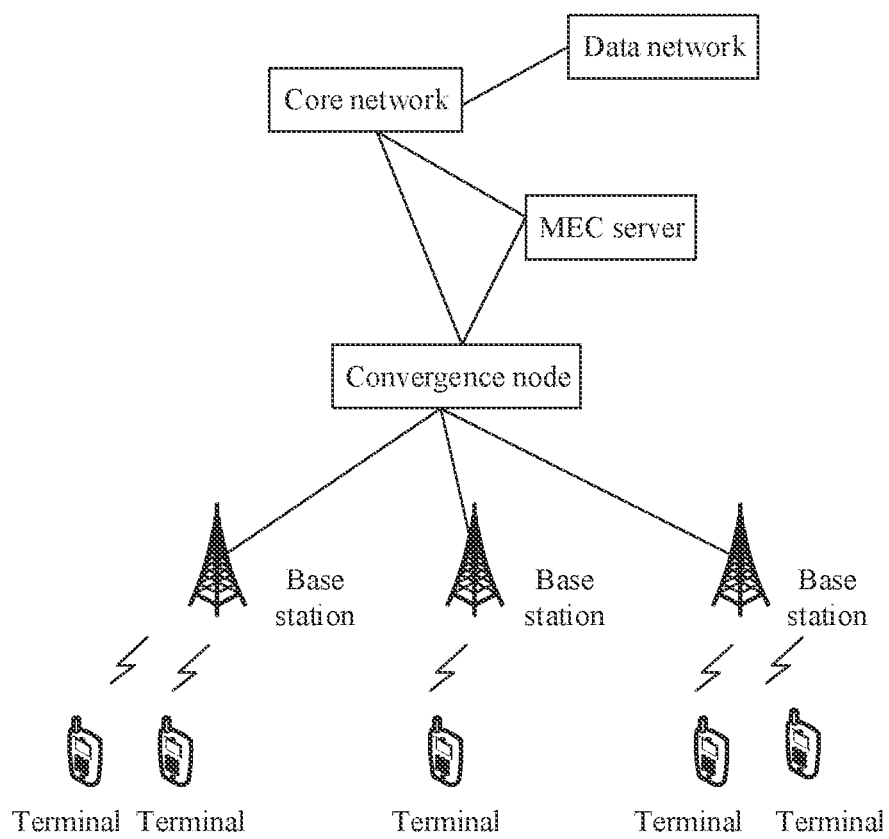
FIG. 1 is a schematic diagram of a possible network architecture according to this application.

FIG. 1 is a schematic diagram of a network architecture applicable to this application. The network architecture is a MEC network architecture. In the MEC architecture, each network edge node (that is, a base station) provides a data service for a user (that is, a terminal) within a service range of the network edge node. Several base stations are connected to a convergence node on a base station side, and the convergence node is connected to a MEC server. The MEC server is located between a wireless access point and a core network, and has storage and computing capabilities. The MEC server is added on the base station side to provide a localized service for a user, thereby effectively saving system resources on a core network side and significantly shortening a corresponding response time.

A capacity planning method provided in this application is jointly completed by a service measurement apparatus and a capacity planning apparatus. The service measurement apparatus is responsible for measuring a data service and learning a service feature parameter. The capacity planning apparatus is responsible for performing overall capacity planning based on a service feature parameter reported by each service measurement apparatus. In an implementation, the service measurement apparatus is deployed on a base station, and the capacity planning apparatus is deployed on a MEC server. In another implementation, the service measurement apparatus is deployed on a terminal, and the capacity planning apparatus is deployed on a base station.

In this application, the terminal is a device having a wireless transceiver function, and may be deployed on land, including indoors or outdoors, or in a handheld manner, or in a vehicle-mounted manner; or may be deployed on the water (such as a ship); or may be deployed in the air (for example, on an airplane, a balloon, and a satellite). The terminal may be a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home), or may include user equipment (user equipment, UE) or the like. Alternatively, the terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, LN), or the like. The terminal sometimes may also be referred to as a terminal device, user equipment (user equipment, UE), an access terminal device, an in-vehicle terminal, an industrial control terminal, a LIE unit, a UE station, a mobile station, a mobile console, a remote station, a remote terminal device, a mobile device, a IE terminal device, a terminal device, a wireless communications device, a UE agent, a U E apparatus, or the like. The terminal may alternatively be fixed or mobile. This is not limited in the embodiments of this application.

The base station is a device providing a wireless communications function for the terminal. The base station includes, for example, but not limited to, a gNodeB (gNode B, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home eNodeB (for example, a home evolved NodeB, or a home NodeB, an HNB), a baseband unit (baseband unit, BBU), a transmitting and receiving point (transmitting and receiving point, TRP), a transmitting point (transmitting point, TP), or a mobile switching center.

In an existing network performance analysis method, a service packet is used as a smallest queuing element based on a conventional queuing theory and some variations thereof, to calculate performance counters such as an average queue length, a waiting delay, and a transmission rate of a network, thereby providing capacity evaluation and planning. In the prior art, a classic Poisson model, an exponential model, and the like are widely used to model network service arrival. For example, service arrival complies with a Poisson distribution model, and service duration complies with an exponential distribution model. These models are all light-tailed models, whose mathematical properties are relatively easy to analyze and deduce, and these models are proved to have good approximations to conventional speech services and low-speed data services.

The foregoing classic light-tailed service model has an "average effect", that is, an average traffic volume is highly representative, and a deviation of a value of a random arriving traffic volume from that of the average traffic volume is small, that is, tail probability decay rate is not slower than exponential decay. However, a mode of such a distribution model is often quite different from a phenomenon observed in a live network. Through data measurement and analysis of a plurality of live network scenarios, it is found that a traffic volume arriving in a current data network is often seriously bursty, and tailing decay of a traffic probability distribution model is slower than that of the exponential distribution model, showing a "heavy tail", and making the average traffic volume not representative. Therefore, existing service models cannot characterize high-speed and complex data services, and have application limitations. On the other hand, when transmitting data, a server of a base station of each of an LTE system and a 5G system uses a single transmission time interval (Transmission Time Interval, TTI) as a smallest scheduling unit in time domain, and a service packet may be divided between adjacent TTIs. This is inconsistent with an application condition of a classic queuing theory using a packet as a smallest unit. Therefore, the conventional queuing theory cannot be applied to LTE and 5G networks, and needs to be analyzed from a more detailed bit level.

In summary, in an existing capacity planning method, it is assumed that a service model complies with a light-tailed distribution model, but actually measured data of the live network indicates that the arriving traffic volume is often bursty, average network performance is often not representative, and a difference from busy-hour network performance is significant. Consequently, an existing light-tailed model is no longer applicable. Therefore, anew model is established in this application. In addition, the existing capacity planning method is based on the classic queuing theory using a packet as a unit, and is inconsistent with a scheduling mode used by the servers of the LTE and 5G base stations. Therefore, calculation is performed in bits in this application.

In view of a data traffic volume feature of an existing network, this application proposes performance counters that can truly reflect user experience, provides network traffic prediction, and resolves a network capacity planning problem.

Figure 2:
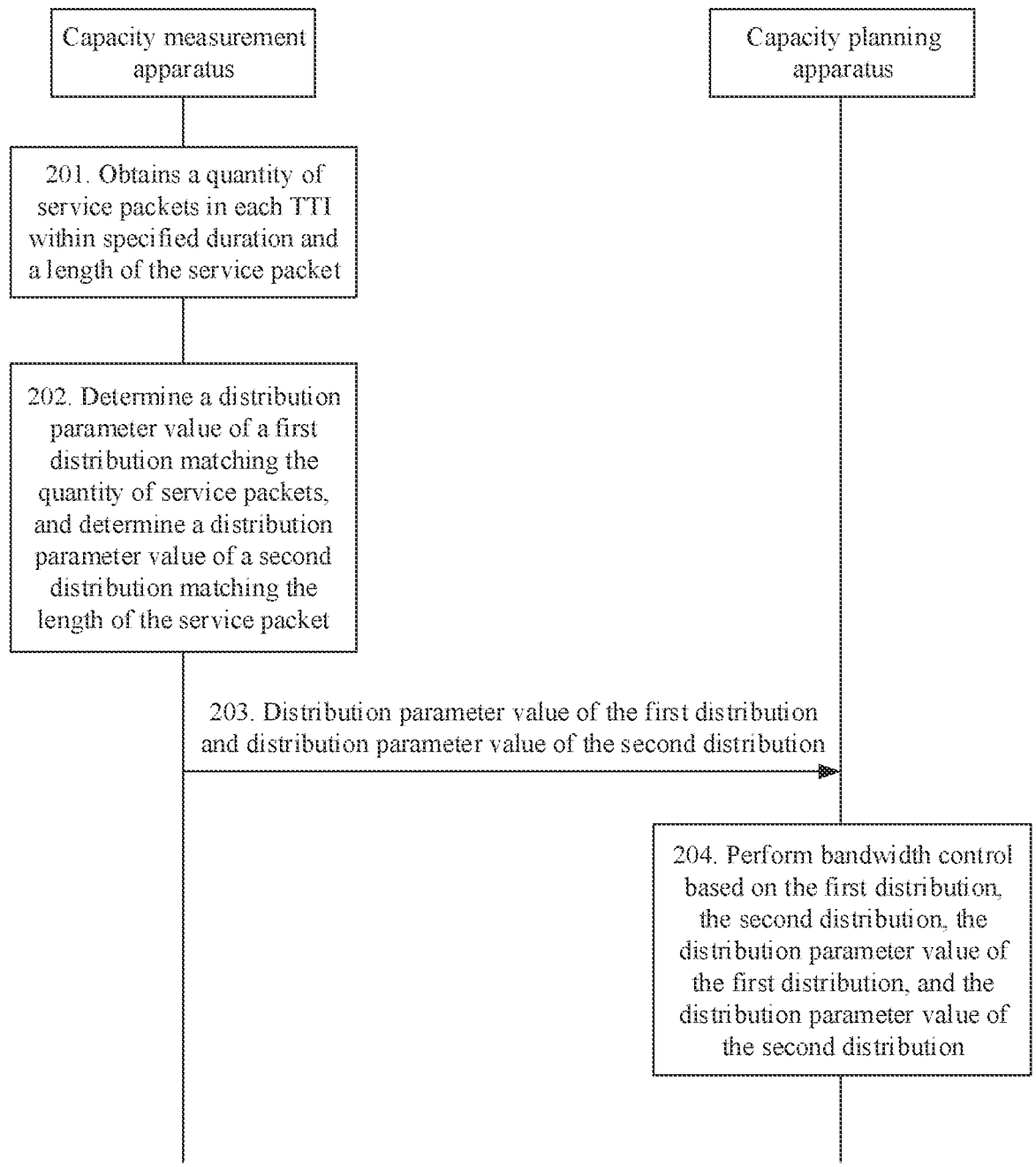
FIG. 2 is a flowchart of a capacity planning method according to this application.

FIG. 2 shows a capacity planning method according to this application. The method includes the following steps.

Step 201. A service measurement apparatus obtains a quantity of service packets in each TTI within specified duration and a length of the service packet.

The length of the service packet is in a unit of bits. For example, service packets in a TTI 1 include a service packet 1, a service packet 2, and a service packet 3, whose lengths are respectively 100 bits, 200 bits, and 300 bits. In this case, a quantity of service packets in the TTI 1 is 3, and the lengths of the service packets are respectively 100 bits, 200 bits, and 300 bits.

In an implementation, if the service measurement apparatus is deployed on a terminal, and a capacity planning apparatus is deployed on a base station, each service measurement apparatus obtains a quantity of service packets of a terminal in each TTI within specified duration and a length of the service packet of the terminal. For example, a service measurement apparatus on a terminal 1 obtains a quantity of service packets of the terminal 1 in each TTI within specified duration and a length of the service packet of the terminal 1 in the TTI, a service measurement apparatus on a terminal 2 obtains a quantity of service packets of the terminal 2 in each TTI within specified duration and a length of the service packet of the terminal 2 in the TTI, and so on.

In another implementation, if the service measurement apparatus is deployed on a base station, and a capacity planning apparatus is deployed on a MEC server, in an implementation, the service measurement apparatus may obtain a quantity of service packets and a length of the service packet on a per terminal basis. Specifically, each service measurement apparatus obtains a quantity of service packets of each terminal accessing the base station in each TTI within specified duration and a length of the service packet of the terminal. For example, terminals accessing a base station 1 include a terminal 1, a terminal 2, and a terminal 3. In this case, a service measurement apparatus on the base station 1 obtains a quantity of service packets of the terminal 1 in each TTI within specified duration and a length of the service packet of the terminal 1 in the TTI, obtains a quantity of service packets of the terminal 2 in each TTI within specified duration and a length of the service packet of the terminal 2 in the TTI, and obtains a quantity of service packets of the terminal 3 in each TTI within specified duration and a length of the service packet of the terminal 3 in the TTI. In another implementation, alternatively, the service measurement apparatus may obtain a quantity of service packets and a length of the service packet on a per base station basis. Specifically, each service measurement apparatus obtains a quantity of service packets of a base station in each TTI within specified duration and a length of the service packet of the base station. Herein, the quantity of service packets of a base station in each TTI is a total quantity of service packets of all terminals accessing the base station in each TTI. Herein, the length of the service packet of the base station in each TTI is a total length of service packets of all terminals accessing the base station in each TTI. For example, terminals accessing a base station 1 include a terminal 1 and a terminal 2. In this case, a service measurement apparatus on the base station 1 obtains a quantity of service packets of the base station 1 in each TTI within specified duration and a length of the service packet of the base station 1 in the TTI. Herein, the quantity of service packets of the base station 1 in each TTI is a total quantity of service packets of the terminal 1 and the terminal 2 in each TTI. Herein, the length of the service packet of the base station 1 in each TTI is a total length of service packets of the terminal 1 and the terminal 2 in each TTI.

Step 202. The service measurement apparatus determines a distribution parameter value of a first distribution model matching the quantity of service packets, and determines a distribution parameter value of a second distribution model matching the length of the service packet.

In this application, a distribution model may also be referred to as a distribution function, or may be briefly referred to as a distribution.

The service measurement apparatus may determine the distribution parameter value of the first distribution model matching the quantity of service packets based on the following method: The service measurement apparatus fits at least two distribution models by using the quantity of service packets, to obtain a fitting degree of each distribution model and a distribution parameter value of the distribution model. Then, the service measurement apparatus determines a distribution model with a highest fitting degree as the first distribution model matching the quantity of service packets, and determines a distribution parameter value of the distribution model with the highest fitting degree as the distribution parameter value of the first distribution model. Optionally, the at least two distribution models include one or more of the following distribution models: a Poisson distribution model and a Zeta distribution model.

That the at least two distribution models include a Poisson distribution model and a Zeta distribution model is used as an example below, to describe a specific implementation method in which the service measurement apparatus determines the distribution parameter value of the first distribution model matching the quantity of service packets.

For example, the service measurement apparatus fits the Poisson distribution model by using the obtained quantity of service packets in each TTI within the specified duration, to obtain a first fitting degree and a distribution parameter value of the Poisson distribution model. The service measurement apparatus fits the Zeta distribution model by using the quantity of service packets, to obtain a second fitting degree and a distribution parameter value of the Zeta distribution model. If the first fitting degree is greater than the second fitting degree, the service measurement apparatus determines that a distribution model parameter of the Poisson distribution model is the distribution parameter value of the first distribution model matching the quantity of service packets, where the first distribution model is the Poisson distribution model. Alternatively, if the first fitting degree is not greater than the second fitting degree, the service measurement apparatus determines that the distribution parameter value of the Zeta distribution model is the distribution parameter value of the first distribution model matching the quantity of service packets, where the first distribution model is the Zeta distribution model.

The Poisson (Possion) distribution model uses $\lambda > 0$ as a parameter, and a form of the Poisson distribution model is as follows:

$$Pr(N_t = n) = \frac{\lambda^n e^{-\lambda}}{n!}, n = 0, 1, 2 \ldots$$

The Zeta distribution model uses $s > 0$ as a parameter, $C(s)$ represents a Riemann Zeta function, $p_0$ represents a probability that a quantity of service packets that arrive is zero, and a form of the Zeta distribution model is as follows:

$$Pr(N_t = n) = \begin{cases} p_0, & n = 0 \\ (1 - p_0)\frac{n^{-s}}{\zeta(s)}, & n = 1, 2, \ldots \end{cases}$$

If the service measurement apparatus determines that the first distribution model matching the quantity of service packets is a Poisson distribution model, the distribution parameter value of the determined first distribution model is a value of A. If the service measurement apparatus determines that the first distribution model matching the quantity of service packets is a Zeta distribution model, the distribution parameter value of the determined first distribution model is a value of s.

In the foregoing method, a distribution model having a highest fitting degree with the quantity of service packets is selected from a plurality of distribution models as the first distribution model for use, thereby helping improve capacity planning accuracy.

The service measurement apparatus may determine the distribution parameter value of the second distribution model matching the length of the service packet based on the following method: The service measurement apparatus fits at least two distribution models by using the length of the service packet, to obtain a fitting degree of each distribution model and a distribution parameter value of the distribution model. Then, the service measurement apparatus determines that a distribution model with a highest fitting degree is the second distribution model matching the length of the service packet, and determines that a distribution parameter value of the distribution model with the highest fitting degree is the distribution parameter value of the second distribution model. Optionally, the at least two distribution models include one or more of the following distribution models: an exponential distribution model and a Pareto distribution model.

That the at least two distribution models include an exponential distribution model and a Pareto distribution model is used as an example below, to describe a specific implementation method in which the service measurement apparatus determines the distribution parameter value of the first distribution model matching the quantity of service packets.

For example, the service measurement apparatus fits the exponential distribution model by using the length of the service packet, to obtain a third fitting degree and a distribution parameter value of the exponential distribution model. The service measurement apparatus fits the Pareto distribution model by using the length of the service packet, to obtain a fourth fitting degree and a distribution parameter value of the Pareto distribution model. If the third fitting degree is greater than the fourth fitting degree, the service measurement apparatus determines that the distribution parameter value of the exponential distribution model is the distribution parameter value of the second distribution model matching the length of the service packet, where the second distribution model is the exponential distribution model. Alternatively, if the third fitting degree is not greater than the fourth fitting degree, the service measurement apparatus determines that a distribution model parameter of the Pareto distribution model is a distribution model parameter of the second distribution model matching the length of the service packet, where the second distribution model is the Pareto distribution model.

The exponential (Exponential) distribution model uses m>0 and a>0 as a parameter, and a form of the exponential distribution model is as follows:

$$f(x) = \begin{cases} \theta e^{-\theta x}, & x \geq 0 \\ 0, & x < 0 \end{cases}$$

The Pareto distribution model uses m>0 and $\alpha$>0 as parameters, and a form of the Pareto distribution model is as follows:

$$f(x) = \begin{cases} \dfrac{\alpha m^\alpha}{x^{\alpha+1}}, & x \geq m \\ 0, & \text{otherwise} \end{cases}$$

If the service measurement apparatus determines that the second distribution model matching the length of the service packet is an exponential distribution model, the distribution parameter value of the determined exponential distribution model is a value of $\theta$. If the service measurement apparatus determines that the second distribution model matching the length of the service packet is a Pareto distribution model, the distribution parameter value of the determined second distribution model is values of m and $\alpha$.

In the foregoing method, a distribution model having a highest fitting degree with the length of the service packet is selected from a plurality of distribution models as the second distribution model for use, thereby helping improve capacity planning accuracy.

In another implementation, alternatively, the service measurement apparatus may determine, based on the following method, the distribution parameter value of the first distribution model matching the quantity of service packets and the distribution parameter value of the first distribution model matching the length of the service packet.

The service measurement apparatus fits a first preset distribution model, to obtain a distribution parameter value of the first preset distribution model. The service measurement apparatus determines that the first preset distribution model is the first distribution model matching the quantity of service packets, and determines that the distribution parameter value of the first preset distribution model is the distribution parameter value of the first distribution model.

The service measurement apparatus fits a second preset distribution model, to obtain a distribution parameter value of the second preset distribution model. The service measurement apparatus determines that the second preset distribution model is the second distribution model matching the length of the service packet, and determines that the distribution parameter value of the second preset distribution model is the distribution parameter value of the second distribution model.

Optionally, the first preset distribution model is a Poisson distribution model or a Zeta distribution model, and the second preset distribution model is an exponential distribution model or a Pareto distribution model.

In this implementation, the service measurement apparatus uses the first preset distribution model as the first distribution model matching the quantity of service packets, and uses the second preset distribution model as the second distribution model matching the length of the service packet. Because there is no need to select a distribution model from a plurality of distribution models, capacity planning efficiency can be improved.

The Zeta distribution model and the Pareto distribution model respectively represent discrete and continuous power law (heavy-tailed) distribution models.

The distribution model matching the quantity of service packets and the distribution model matching the length of the service packet may form four service arrival models shown in Table 1 below.

TABLE 1

Four service arrival models and typical application scenarios

| | Length of the service packet | |
|---|---|---|
| Quantity of service packets | Exponential distribution model ($\theta$) | Pareto distribution model (m and $\alpha$) |
| Piosson (Possion) distribution model ($\lambda$) | PE model Scenario: Single voice | PP model Scenario: Macro cell, remote area |
| Zeta distribution model (s) | ZE model Scenario: Idle hour in a business district | ZP model Scenario: Busy hour in a business district |

It can be learned from Table 1 that, when the quantity of service packets matches the Poisson distribution model, and the length of the service packet matches the exponential distribution model, it may be considered that a service complies with the PE model, and a general scenario is single voice.

When the quantity of service packets matches the Poisson distribution model, and the length of the service packet matches the Pareto distribution model, it may be considered that a service complies with the PP model, and general scenarios are a macro cell and a remote area.

When the quantity of service packets matches the Zeta distribution model, and the length of the service packet matches the exponential distribution model, it may be considered that a service complies with the ZE model, and a general scenario is an idle hour in a business district.

When the quantity of service packets matches the Zeta distribution model, and the length of the service packet matches the Pareto distribution model, it may be considered that a service complies with the PP model, and a general scenario is a busy hour in a business district.

It should be noted that a "fitting" method used is not limited in this application. For example, fitting may be performed by using a least square method.

Step 203. The service measurement apparatus sends the distribution parameter value of the first distribution model and the distribution parameter value of the second distribution model to a capacity planning apparatus.

In another implementation, the service measurement apparatus sends identification information of the first distribution model, identification information of the second distribution model, the distribution parameter value of the first distribution model, and the distribution parameter value of the second distribution model to the capacity planning apparatus. The identification information of the first distribution model is used to identify the selected first distribution model, and the identification information of the second distribution model is used to identify the selected second distribution model. Based on the implementation method, the capacity planning apparatus may learn of the first distribution model and the second distribution model that are selected by the service measurement apparatus, and learn of the distribution parameter value of the first distribution model and the distribution parameter value of the second distribution model.

In another implementation, the service measurement apparatus sends identification information of a service arrival model to the capacity planning apparatus, where the identification information of the service arrival model is used to identify the service arrival model corresponding to the selected first distribution model and the selected second distribution model. Further, the capacity planning apparatus may determine the selected first distribution model and the selected second distribution model based on the identification information of the service arrival model. For example, if the identification information of the service arrival model that is sent by the service measurement apparatus to the capacity planning apparatus indicates the PE model in Table 1, the service measurement apparatus may determine that the selected first distribution model and the selected second distribution model are respectively a Poisson distribution model and an exponential distribution model. For another example, if the identification information of the service arrival model that is sent by the service measurement apparatus to the capacity planning apparatus indicates the PP model in Table 1, the service measurement apparatus may determine that the selected first distribution model and the selected second distribution model are respectively a Poisson distribution model and a Pareto distribution model, and so on.

In an implementation, the service measurement apparatus may send a first report message to the capacity planning apparatus, where the first report message includes an identifier of the first distribution model and an identifier of the second distribution model. In this way, the capacity planning apparatus may learn of a type of a matched distribution model determined by the service measurement apparatus, so as to reserve a corresponding resource. Then, the capacity planning apparatus sends a first response message for the first report message to the service measurement apparatus. Then, the service measurement apparatus sends a second report message to the capacity planning apparatus, where the second report message includes the distribution parameter value of the first distribution model and the distribution parameter value of the second distribution model. Optionally, the capacity planning apparatus may further send a second response message for the second report message to the service measurement apparatus. Based on the method, the distribution parameter value of the first distribution model and the distribution parameter value of the second distribution model can be sent to the capacity planning apparatus.

In an implementation, that the first report message includes the identifier of the first distribution model and the identifier of the second distribution model may be replaced with that the first report message includes a model identifier. For example, "00" indicates the PE model, "01" indicates the PP model, "10" indicates the ZE model, and "11" indicates the ZP model. In this way, types of the first distribution model and the second distribution model can also be sent to the capacity planning apparatus.

Step 204. The capacity planning apparatus performs bandwidth control based on the first distribution model, the second distribution model, the distribution parameter of the first distribution model, and the distribution parameter of the second distribution model.

Based on the solution in the embodiment shown in FIG. 1, the distribution model is matched based on the quantity of service packets in each transmission time interval within the specified duration, to obtain the matched first distribution model, the distribution model is matched based on the length of the service packet, to obtain the second distribution model, and the bandwidth control is performed based on the first distribution model, the second distribution model, the distribution parameter of the first distribution model, and the distribution parameter of the second distribution model. Because bandwidth control is performed based on a matched distribution model and a distribution parameter of a distribution model, it helps provide more accurate capacity planning for a user.

For example, the following provides a specific implementation of step 204.

The performing, by the capacity planning apparatus, bandwidth control based on the first distribution model, the second distribution model, a distribution parameter of the first distribution model, and a distribution parameter of the second distribution model specifically includes:

Step A. The capacity planning apparatus determines a user experienced rate distribution model based on the first distribution model, the second distribution model, a downlink transmission rate of a base station, and the transmission time interval.

Step B. The capacity planning apparatus performs bandwidth control based on the user experienced rate distribution model, the distribution parameter value of the first distribution model, the distribution parameter value of the second distribution model, and a quality of service requirement parameter value. For the foregoing step A, the following provides an example for description.

The user experienced rate herein may also be referred to as a user rate, or referred to as an actual user rate, or referred to as a user used rate. The user herein refers to a terminal that accesses the base station.

For example, when the service measurement apparatus is deployed on the terminal, and the capacity planning apparatus is deployed on the base station, the user experienced rate is an experienced rate of the terminal corresponding to the service measurement apparatus. In addition, the downlink transmission rate of the base station is a downlink transmission rate of the base station for the terminal.

For another example, when the service measurement apparatus is deployed on the base station, and the capacity planning apparatus is deployed on a MEC server, if the service measurement apparatus measures, on a per terminal basis, a quantity of service packets and a length of the service packet of each terminal accessing the base station in each TTI, the user experienced rate is an experienced rate of each terminal; and if the service measurement apparatus measures, on a per base station basis, a quantity of service packets and a length of the service packet of all terminals accessing the base station in each TTI, the user experienced rate is a sum of experienced rates of all the terminals. In addition, the downlink transmission rate of the base station is a sum of downlink transmission rates of the base station for all the terminals accessing the base station.

There are specifically the following four types of user experienced rate distribution models obtained based on different first distribution models and different second distribution models.

(1) User experienced rate distribution model 1: The user experienced rate distribution model 1 corresponds to the PE model (the first distribution model is a Poisson distribution model, and the second distribution model is an exponential distribution model):

$$Pr(R_U > x) \approx \begin{cases} e^{-(\theta \tau - \frac{\lambda}{R})x}, & x < R, \\ 0, & x \geq R \end{cases}$$

Pr( ) is the user experienced rate distribution model, x is an independent variable of a user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, $\tau$ is the TTI, $\lambda$ is a parameter of the Poisson (Possion) distribution model, and $\theta$ is a parameter of the exponential distribution model.

(2) User experienced rate distribution model 2: The user experienced rate distribution model 2 corresponds to the PP model (the first distribution model is a Poisson distribution model, and the second distribution model is a Pareto distribution model):

$$Pr(R_U > x) \approx \begin{cases} \frac{\lambda m^\alpha}{(R\tau - E[S])(\alpha - 1)}(\tau x - \lambda m + m)^{-\alpha+1}, & x < R, \\ 0, & x \geq R \end{cases}$$

Pr( ) is the user experienced rate distribution model, x is an independent variable of the user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, r is the TTI, E[S] is an expected value of a quantity of bits that arrive within one TTI, $\lambda$ is a parameter of the Poisson (Possion) distribution model, and m and a are parameters of the Pareto distribution model.

(3) User experienced rate distribution model 3: The user experienced rate distribution model 3 corresponds to the ZE model (the first distribution model is a Zeta distribution model, and the second distribution model is an exponential distribution model):

$$Pr(R_U > x) \approx \begin{cases} \frac{(1-p_0)R\theta}{(R\tau - E[S])\zeta(s)} \int_{\frac{\tau x}{R}}^{\infty} \int_{Ry}^{\infty} e^{-\theta z} {}_sF_s(a_1, \ldots, a_s; b_1, \ldots, b_s; \theta z) dz dy, & x < R, \\ 0, & x \geq R \end{cases}$$

$a_1 = \ldots = a_s = 1$ and $b_1 = \ldots = b_s = 2$.

Note: ${}_pF_q(a_1, \ldots, a_p; b_1, \ldots, b_q; x)$ is a generalized hypergeometric function, and its series is expanded as follows:

$$_qF_q(a_1, \ldots, a_p; b_1, \ldots, b_q; x) = \sum_{k=0}^{\infty} \frac{(a_1)_k \cdots (a_p)_k}{(b_1)_k \cdots (b_q)_k} \frac{x^k}{k!}$$

Pr( ) is the user experienced rate distribution model, x is an independent variable of the user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, $\tau$ is the TTI, E[S] is an expected value of a quantity of bits that arrive within one TTI, $\zeta( )$ is a Riemann function, $p_0$ is a probability that a quantity of service packets that arrive is zero, s is a parameter of the Zeta distribution model, and $\theta$ is a parameter of the exponential distribution model.

(4) User experienced rate distribution model 4: The user experienced rate distribution model 4 corresponds to the ZP model (the first distribution model is a Zeta distribution model, and the second distribution model is a Pareto distribution model):

$$Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$

Pr( ) is the user experienced rate distribution model, x is an independent variable of the user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, $\tau$ is the TTI, E[S] is an expected value of a quantity of bits that arrive within one TTI, $\zeta( )$ is a Riemann function, $p_0$ is a probability that a quantity of service packets that arrive is zero, s is a parameter of the Zeta distribution model, and m and $\alpha$ are parameters of the Pareto distribution model.

For the foregoing step B, the following provides an example for description.

The quality of service requirement parameter value is a value of a quality of service requirement parameter. In a specific implementation, the quality of service requirement parameter may be implemented in a plurality of manners based on an actual requirement. In this application, an example in which the quality of service requirement parameter is preset bandwidth utilization or a preset user experienced rate satisfaction degree is used for description.

The following provides two bandwidth control solutions.

Solution 1: The capacity planning apparatus determines a busy-hour average user experienced rate value based on the user experienced rate distribution model, the distribution parameter value of the first distribution model, the distribution parameter value of the second distribution model, and the preset bandwidth utilization. The capacity planning apparatus performs bandwidth control based on the busy-hour average user experienced rate value.

To reflect busy-hour user experiences, this application defines a new measurement counter: a busy-hour user experienced rate $R_{busy}$. A physical meaning of the new measurement counter is explained as follows: When a queue threshold $Q_\varepsilon$ is given, if $Q(t)>Q_\varepsilon$, the moment is defined as a network busy hour, and the user experienced rate in this case is defined as a busy-hour user experienced rate, that is $\{R_{busy}\}=\{R_U(t)|Q(t)>Q_\varepsilon\}$. Therefore, a busy-hour average user experienced rate is $\overline{R}_{busy}, =E[R_U(t)|Q(t)>Q_\varepsilon]$.

The foregoing four types of user experienced rate distribution models respectively correspond to different busy-hour average user experienced rate formulas as follows.

(1) Busy-hour average user experienced rate formula 1: The busy-hour average user experienced rate formula 1 corresponds to the user experienced rate distribution model 1. That is, the busy-hour average user experienced rate formula 1 may be obtained based on the user experienced rate distribution model 1:

$$\overline{R}_{busy} = \frac{R(1-e^{-(\theta R\tau - \lambda)})}{(\theta R\tau - \lambda)e^{-\varepsilon(\theta R\tau - \lambda)}}.$$

$\overline{R}_{busy}$ is the busy-hour average user experienced rate value, R is the downlink transmission rate of the base station, $\tau$ is the TTI, $\lambda$ is a parameter of the Poisson (Possion) distribution model, and $\theta$ is a parameter of the exponential distribution model.

(2) Busy-hour average user experienced rate formula 2: The busy-hour average user experienced rate formula 2 corresponds to the user experienced rate distribution model 2. That is, the busy-hour average user experienced rate formula 2 may be obtained based on the user experienced rate distribution model 2:

$$\overline{R}_{busy} = \frac{(R\tau - \lambda m + m)^{2-\alpha} - (m+\lambda m)^{2-\alpha}}{\tau(2-\alpha)(\varepsilon R\tau - \lambda m + m)^{-\alpha+1}}.$$

$\overline{R}_{busy}$ is the busy-hour average user experienced rate value, R is the downlink transmission rate of the base station, $\tau$ is the TTI, $\lambda$ is a parameter of the Poisson (Possion) distribution model, and m and a are parameters of the Pareto distribution model.

(3) Busy-hour average user experienced rate formula 3: The busy-hour average user experienced rate formula 3 corresponds to the user experienced rate distribution model 3. That is, the busy-hour average user experienced rate formula 3 may be obtained based on the user experienced rate distribution model 3:

$$\overline{R}_{busy} = \frac{\frac{R}{\tau}\int_0^\tau w \int_{Ry}^\infty H(z;\theta,s)dzdy + R\int_0^\tau \int_{Ry}^\infty H(z;\theta,s)dzdy}{\int_{s\tau}^\infty \int_{Ry}^\infty H(z;\theta,s)dzdy},$$

where $H(z;\theta,s) = e^{-\theta z}{}_sF_s(a_1,\ldots,a_s;b_1,\ldots,b;\theta z)$.

$\overline{R}_{busy}$ is the busy-hour average user experienced rate value, R is the downlink transmission rate of the base station, $\tau$ is the TTI, s is a parameter of the Zeta distribution model, and $\theta$ is a parameter of the exponential distribution model.

(4) Busy-hour average user experienced rate formula 4: The busy-hour average user experienced rate formula 4 corresponds to the user experienced rate distribution model 4. That is, the busy-hour average user experienced rate formula 4 may be obtained based on the user experienced rate distribution model 4:

$$\overline{R}_{busy} = \frac{\left(R\tau - \frac{\zeta(s-1)}{\zeta(s)}m + m\right)^{2-\alpha} - \left(m - \frac{\zeta(s-1)}{\zeta(s)}m\right)^{2-\alpha}}{\tau(2-\alpha)\left(\varepsilon R\tau - \frac{\zeta(s-1)}{\zeta(s)}m + m\right)^{-\alpha+1}}.$$

$\overline{R}_{busy}$ is the busy-hour average user experienced rate value, R is the downlink transmission rate of the base station, $\tau$ is the TTI, S is a parameter of the Zeta distribution model, $\varepsilon$ is the preset bandwidth utilization, $0 \leq \varepsilon \leq 1$, and m and a are parameters of the Pareto distribution model.

After the busy-hour average user experienced rate value is obtained through calculation, the performing, by the capacity planning apparatus, bandwidth control based on the busy-hour average user experienced rate value specifically includes: increasing a bandwidth if a difference between the busy-hour average user experienced rate value and the downlink transmission rate of the base station is greater than a first difference threshold; or reducing a bandwidth if a difference between the busy-hour average user experienced rate value and the downlink transmission rate of the base station is less than a second difference threshold. For example, if the first difference threshold is 20 M, the second difference threshold is −10 M, and the downlink transmission rate of the base station is 50 M, when the busy-hour average user experienced rate value exceeds 70 M, the bandwidth needs to be increased. An increase method may be, for example, increasing a fixed bandwidth value, or increasing the bandwidth based on the difference between the busy-hour average user experienced rate value and the downlink transmission rate of the base station. When the busy-hour average user experienced rate value is lower than 40 M, the bandwidth needs to be decreased. A decrease method may be, for example, decreasing a fixed bandwidth value, or decreasing the bandwidth based on the difference between the busy-hour average user experienced rate value and the downlink transmission rate of the base station.

Optionally, an hour-level traffic prediction value may be further obtained based on the busy-hour average user experienced rate value, that is, $T_{prediction} = \overline{R}_{busy}*3600/8/1024$, and a unit is GB. A bandwidth allocation method of the base station is determined by comparing a traffic threshold $\theta_{th}$ of the base station with $T_{prediction}$, so as to perform bandwidth control. For example, when a difference between $T_{prediction}$ and $\theta_{th}$ is greater than a preset first traffic difference threshold, the bandwidth is increased; or when a difference between $T_{prediction}$ and $\theta_{th}$ is less than a preset second traffic difference threshold, the bandwidth is decreased.

In a possible implementation method, for the solution 1, the obtaining, by a service measurement apparatus, a quantity of service packets in each transmission time interval within specified duration and a length of the service packet in step 201 may be, for example, as follows:

Method 1: The service measurement apparatus periodically obtains the quantity of service packets in each transmission time interval within the specified duration and the length of the service packet.

The service measurement apparatus may measure and record, in real time, a quantity of service packets that arrive in each TTI and a length of the service packet, and then periodically perform fitting on the quantity of service packets and the length of the service packet, to obtain a distribution parameter of a matched distribution model. Therefore, before fitting, a recorded quantity of service packets that arrive in a TTI and a recorded length of the service packet need to be obtained. Based on the method 1, the service measurement apparatus periodically obtains the recorded quantity of service packets that arrive in the TTI and the recorded length of the service packet, and periodically performs fitting on the obtained quantity of service packets and the obtained length of the service packet.

For example, if the specified duration is a specified day, and a period is set to one hour, the service measurement apparatus obtains the quantity of service packets in each transmission time interval and the length of the service packet once every one hour, fits the distribution model based on the obtained quantity of service packets and the obtained length of the service packet, to obtain the distribution parameter of the first distribution model and the distribution parameter of the second distribution model, and then, reports the first distribution model, the second distribution model, the distribution parameter of the first distribution model, and the distribution parameter of the second distribution model to the capacity planning apparatus.

Method 2: The service measurement apparatus periodically obtains a quantity of service packets that are in each transmission time interval that meets a preset busy-hour condition and that are within specified duration and a length of the service packet.

The service measurement apparatus may measure and record, in real time, a quantity of service packets that arrive in each TTI and a length of the service packet, and then periodically perform fitting on the quantity of service packets and the length of the service packet, to obtain a distribution parameter of a matched distribution model. Therefore, before fitting, a recorded quantity of service packets that arrive in a TTI that meets a busy-hour condition and a recorded length of the service packet need to be obtained. Based on the method 2, the service measurement apparatus periodically obtains the recorded quantity of service packets that arrive in the TTI that meets the busy-hour condition and the recorded length of the service packet, and periodically performs fitting on the obtained quantity of service packets and the obtained length of the service packet.

For example, if the specified duration is a specified day, and a period is set to one hour, the service measurement apparatus obtains the quantity of service packets and the length of the service packet in each transmission time interval that meets the busy-hour condition and the length of the service packet once every one hour, fits the distribution model based on the obtained quantity of service packets and the obtained length of the service packet, to obtain the distribution parameter of the first distribution model and the distribution parameter of the second distribution model, and then, reports the first distribution model, the second distribution model, the distribution parameter of the first distribution model, and the distribution parameter of the second distribution model to the capacity planning apparatus.

For example, if the busy-hour condition is met in 30 minutes in a first hour, a quantity of service packets in each transmission time interval that meets the busy-hour condition and that is in the hour and a length of the service packet are used, a distribution model is fitted based on the obtained quantity of service packets and the obtained length of the service packet, to respectively obtain the distribution parameter of the first distribution model and the distribution parameter of the second distribution model, and then, the first distribution model, the second distribution model, the distribution parameter of the first distribution model, and the distribution parameter of the second distribution model are reported to the capacity planning apparatus.

For another example, if the busy-hour condition is met in 25 minutes in a second hour, a quantity of service packets in each transmission time interval in the 25 minutes meeting the busy-hour condition in the hour and a length of the service packet are used, a distribution model is fitted based on the obtained quantity of service packets and the obtained length of the service packet, to respectively obtain the distribution parameter of the first distribution model and the distribution parameter of the second distribution model, and then, the first distribution model, the second distribution model, the distribution parameter of the first distribution model, and the distribution parameter of the second distribution model are reported to the capacity planning apparatus.

It should be noted that, in the foregoing example, the 30 minutes and the 25 minutes that meet the busy-hour condition may be continuous time, or may be discontinuous cumulative time.

In an implementation, that the busy-hour condition is met may be, for example, if a length of a queue on the base station at a moment t (that is, a $t^{th}$ transmission time interval) is greater than a preset queue threshold, it is determined that the busy-hour condition is met. The queue on the base station is used to buffer the service packet, and the preset queue threshold may be, for example, defined as $Q_\varepsilon = \varepsilon R \tau$. $Q_\varepsilon$ is the queue threshold, $\varepsilon$ is preset bandwidth utilization, R is the downlink transmission rate of the base station, and $\tau$ is a length of the transmission time interval.

Solution 2: The capacity planning apparatus determines a lower limit value of the user experienced rate based on the user experienced rate distribution model, the distribution parameter value of the first distribution model, the distribution parameter value of the second distribution model, and the preset user experienced rate satisfaction degree. The capacity planning apparatus performs bandwidth control based on the lower limit value of the user experienced rate.

A preset user experienced rate satisfaction degree $\eta$ is given. To ensure user service quality, a minimum rate $R_0$ that can ensure the user experienced rate satisfaction degree needs to be found, so that a probability that the user experienced rate exceeds $R_0$ is not less than the preset user experienced rate satisfaction degree $\eta$, that is, $$Pr(R_U > R_0) \geq \eta.$$

$Pr(R_U>R_0)=\eta$ is used, and the lower limit value RX of the user experienced rate may be obtained, where $R_0=R_{min}$. In this application, the lower limit R of the user experienced rate is calculated by using the formula of the user experienced rate distribution model and by solving the equation $Pr(R_U>R_{min})=7$.

User experienced rate lower limit formulas are as follows:

(1) User experienced rate lower limit formula 1: The user experienced rate lower limit formula 1 corresponds to the user experienced rate distribution model 1, that is, the user experienced rate lower limit formula 1 may be obtained based on the user experienced rate distribution model 1:

$$e^{-(\theta\tau-\frac{\lambda}{R})R_{min}} = \eta.$$

$\lambda$ is a parameter of the Poisson (Possion) distribution model, and $\theta$ is a parameter of the exponential distribution model.

(2) User experienced rate lower limit formula 2: The user experienced rate lower limit formula 2 corresponds to the user experienced rate distribution model 2, that is, the user experienced rate lower limit formula 2 may be obtained based on the user experienced rate distribution model 2:

$$\frac{\lambda m^\alpha}{(R\tau - E[S])(\alpha-1)}(\tau R_{min} - \lambda m + m)^{\alpha+1} = \eta.$$

R is the downlink transmission rate of the base station, $\tau$ is the TTI, E[S] is an expected value of a quantity of bits that arrive within one TTI, $\lambda$ is a parameter of a Poisson (Possion) distribution model, and m and a are parameters of a Pareto distribution model.

(3) User experienced rate lower limit formula 3: The user experienced rate lower limit formula 3 corresponds to the user experienced rate distribution model 3, that is, the user experienced rate lower limit formula 3 may be obtained based on the user experienced rate distribution model 3:

$$\frac{(1-p_0)R\theta}{(R\tau - E[S])\zeta(s)}\int_{\frac{\tau R_{min}}{R}}^{\infty}\int_{R_y}^{\infty} e_s^{-\theta z} F_s(a_1, \ldots, a_s; b_1, \ldots, b_s; \theta z)dzdy = \eta.$$

$\tau$ is the TTI, E[S] is an expected value of a quantity of bits that arrive within one TTI, $\zeta(\ )$ is a Riemann function, R is the downlink transmission rate of the base station, $p_0$ is a probability that a quantity of service packets that arrive is zero, s is a parameter of the Zeta distribution model, and $\theta$ is a parameter of the exponential distribution model.

(4) User experienced rate lower limit formula 4: The user experienced rate lower limit formula 4 corresponds to the user experienced rate distribution model 4, that is, the user experienced rate lower limit formula 4 may be obtained based on the user experienced rate distribution model 4:

$$\frac{(1-p_0)\zeta(s-1)m^\alpha}{(R\tau - E[S])\zeta(s)(\alpha-1)}\left(\tau R_{min} - \frac{\zeta(s-1)}{\zeta(s)}m + m\right)^{-\alpha+1} = \eta.$$

R is the downlink transmission rate of the base station, Q(t) is a length of a queue on the base station at a moment t, the queue is used to buffer the service packet, $\tau$ is the TTI, E[S] is an expected value of a quantity of bits that arrive within one TTI, $\zeta(\ )$ is a Riemann function, $p_0$ is a probability that a quantity of service packets that arrive is zero, S is a parameter of the Zeta distribution model, and n and a are parameters of the Pareto distribution model.

For example, the preset user experienced rate satisfaction degree $\eta=95\%$. With reference to reported fitting parameters of the length of the service packet and the quantity of service packets, and system parameters such as the downlink transmission rate of the base station and TTI duration, the user experienced rate lower limit $R_{min}$ may be determined and solved by using the foregoing four formulas.

In an implementation, the performing, by the capacity planning apparatus, bandwidth control based on the lower limit value of the user experienced rate includes: increasing a bandwidth if a difference between the lower limit value of the user experienced rate and the downlink transmission rate of the base station is greater than a third difference threshold; or reducing a bandwidth if a difference between the busy-hour average user experienced rate value and the downlink transmission rate of the base station is less than a fourth difference threshold. For example, if the first difference threshold is 20 M, the second difference threshold is −10 M, and the downlink transmission rate of the base station is 50 M, when the lower limit value of the user experienced rate exceeds 70 M, the bandwidth needs to be increased. An increase method may be, for example, increasing a fixed bandwidth value, or increasing the bandwidth based on the difference between the lower limit value of the user experienced rate and the downlink transmission rate of the base station. When the lower limit value of the user experienced rate is lower than 40 M, the bandwidth needs to be decreased. A decrease method may be, for example, decreasing a fixed bandwidth value, or decreasing the bandwidth based on the difference between the lower limit value of the user experienced rate and the downlink transmission rate of the base station.

Optionally, an hour-level traffic prediction value may be further obtained based on the lower limit value of the user experienced rate, that is, $T_{prediction}=\bar{R}_{busy}*3600/8/1024$, and a unit is GB. A bandwidth allocation method of the base station is determined by comparing a traffic lower limit threshold $\theta_{th}$ of the base station with $T_{prediction}$, so as to perform bandwidth control. For example, when a difference between $T_{prediction}$ and $\theta_{th}$ is greater than a preset third traffic difference threshold, the bandwidth is increased; or when a difference between $T_{prediction}$ and $\theta_{th}$ is less than a preset fourth traffic difference threshold, the bandwidth is decreased.

In a possible implementation method, for the solution 2, the obtaining, by a service measurement apparatus, a quantity of service packets in each transmission time interval within specified duration and a length of the service packet in step 201 may be, for example, as follows:

The service measurement apparatus periodically obtains the quantity of service packets in each transmission time interval within the specified duration and the length of the service packet.

For example, if the specified duration is a specified day, and a period is set to one hour, the service measurement apparatus obtains the quantity of service packets in each transmission time interval and the length of the service packet once every one hour, fits the distribution model based on the obtained quantity of service packets and the obtained length of the service packet, to obtain the distribution parameter of the first distribution model and the distribution parameter of the second distribution model, and then, reports the first distribution model, the second distribution model, the distribution parameter of the first distribution model, and the distribution parameter of the second distribution model to the capacity planning apparatus.

In an implementation, when the service measurement apparatus is deployed on the base station, and the capacity planning apparatus is deployed on the MEC server, in step B, that the capacity planning apparatus performs bandwidth control may be implemented, for example, by using the following method: The capacity planning apparatus sends a first notification message to the service measurement apparatus, where the first notification message includes a bandwidth control policy. The bandwidth control policy herein may be increasing the bandwidth or reducing decreasing the bandwidth. Then, the service measurement apparatus sends a first acknowledgment message for the first notification message to the capacity planning apparatus. Then, the capacity planning apparatus sends a second notification message to the service measurement apparatus, where the second notification message includes a bandwidth value. In this way, the service measurement apparatus may perform bandwidth control based on the bandwidth value. Specifically, after receiving the bandwidth value, the base station may perform bandwidth control on a corresponding terminal based on the bandwidth value. The bandwidth value herein may be an increased or a decreased relative bandwidth value, or may be a bandwidth value obtained after the service measurement apparatus controls a bandwidth of the terminal or the base station. Optionally, the service measurement apparatus may further send a second response message for the second notification message to the capacity planning apparatus.

In another implementation, when the service measurement apparatus is deployed on the terminal, and the capacity planning apparatus is deployed on the base station, in step B, that the capacity planning apparatus performs bandwidth control may be implemented, for example, by using the following method: The capacity planning apparatus notifies the base station of a bandwidth value of each terminal. The bandwidth value herein may be an increased or a decreased relative bandwidth value, or may be a bandwidth value obtained after the service measurement apparatus controls a bandwidth of the terminal or the base station. Then, the base station performs bandwidth control on the corresponding terminal based on the received bandwidth value.

It should be noted that, during system initialization, total network bandwidth may be evenly allocated between base stations, and network bandwidth of a base station may also be evenly allocated between terminals in the base station. In a service process, some terminal/base station services are relatively busy and a requirement for bandwidth increases, while some terminal/base station services are relatively idle and a requirement for bandwidth decreases. Therefore, bandwidth control on each terminal/base station may be performed by using the foregoing capacity planning method in this application, so that corresponding bandwidth control may be performed based on service saturation of each terminal, thereby helping improve system efficiency and resource utilization efficiency.

In the foregoing solution of this application, a simple and practical model of service arrival and a service packet length is extracted, so as to implement fast learning of a service feature parameter, and complexity is lower than that in the prior art. In addition, the capacity planning apparatus may directly reflect user experience quality in a network based on a user experienced rate distribution model, thereby providing a precise basis for an operator to improve network service quality. Therefore, the capacity planning method in this application can effectively predict network traffic, and properly plan bandwidth allocation.

Figure 3:
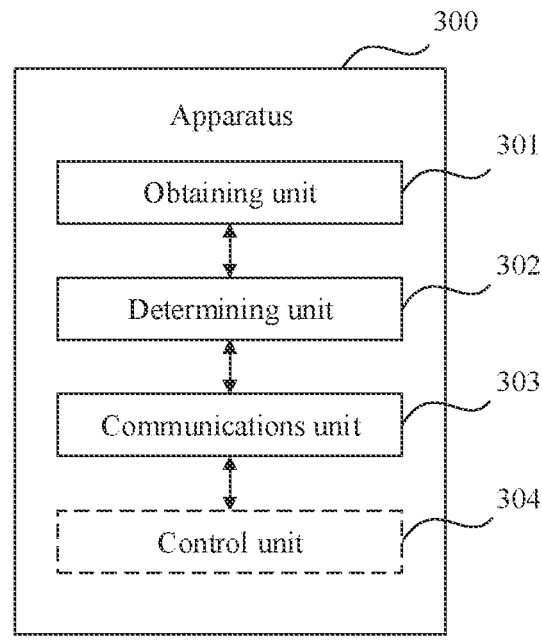
FIG. 3 is a schematic diagram of an apparatus according to this application.

FIG. 3 is a possible example block diagram of an apparatus according to an embodiment of the present invention. The apparatus 300 may exist in a form of software or hardware. The apparatus 300 may include an obtaining unit 301, a determining unit 302, and a communications unit 303. Optionally, the apparatus 300 may further include a control unit 304. In an implementation, the communications unit 303 may include a receiving unit and a sending unit. In an implementation, the obtaining unit 301, the determining unit 302, and the control unit 304 may be integrated into one processing unit, and the processing unit is configured to control and manage an action of the apparatus 300. The communications unit 303 is configured to support the apparatus 300 in communicating with another network entity.

When the obtaining unit 301, the determining unit 302, and the control unit 304 may be integrated into one processing unit, the processing unit may be a processor or a controller, for example, may be a general-purpose central processing unit (central processing unit, CPU), a general purpose processor, a digital signal processor (digital signal processing, DSP), an application-specific integrated circuit (application specific integrated circuits, ASIC), a field programmable gate array (field programmable gate array, FPGA), or another programmable logic device, a transistor logic device, a hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 304 may be a communications interface, a transceiver, a transceiver circuit, or the like. The communications interface is a general term, and in a specific implementation, the communications interface may include a plurality of interfaces.

The apparatus 300 may be the service measurement apparatus in any one of the foregoing embodiments, or may be a chip that can be used in the service measurement apparatus. For example, when the apparatus 300 is the service measurement apparatus, and the obtaining unit 301, the determining unit 302, and the control unit 304 are integrated into one processing unit, the processing unit may be, for example, a processor, the communications unit 303 may be, for example, a transceiver, and the transceiver includes a radio frequency circuit. For example, when the apparatus 300 is the chip that may be used in the service measurement apparatus, and the obtaining unit 301, the determining unit 302, and the control unit 304 are integrated into one processing unit, the processing unit may be, for example, a processor, and the communications unit 303 may be, for example, an input/output interface, a pin, or a circuit.

The obtaining unit 301 is configured to obtain a quantity of service packets in each transmission time interval within specified duration and a length of the service packet.

The determining unit 302 is configured to: determine a distribution parameter value of a first distribution model matching the quantity of service packets, and determine a distribution parameter value of a second distribution model matching the length of the service packet.

The communications unit 303 is configured to send the distribution parameter value of the first distribution model and the distribution parameter value of the second distribution model to a capacity planning apparatus.

In a possible implementation method, the determining unit 302 is specifically configured to: fit at least two distribution models by using the quantity of service packets, to obtain a fitting degree of each distribution model and a distribution parameter value of the distribution model; and determine that a distribution model with a highest fitting degree is the first distribution model matching the quantity of service packets, and determine that a distribution parameter value of the distribution model with the highest fitting degree is the distribution parameter value of the first distribution model.

In a possible implementation method, the at least two distribution models include one or more of the following distribution models: a Poisson distribution model and a Zeta distribution model.

In a possible implementation method, the determining unit 302 is specifically configured to: fit at least two distribution models by using the length of the service packet, to obtain a fitting degree of each distribution model and a distribution parameter value of the distribution model; and determine that a distribution model with a highest fitting degree is the second distribution model matching the length of the service packet, and determine that a distribution parameter value of the distribution model with the highest fitting degree is the distribution parameter value of the second distribution model.

In a possible implementation method, the at least two distribution models include one or more of the following distribution models: an exponential distribution model and a Pareto distribution model.

In a possible implementation, the determining unit 302 is specifically configured to:

fit a first preset distribution model, to obtain a distribution parameter value of the first preset distribution model; and determine that the first preset distribution model is the first distribution model matching the quantity of service packets, and determine that the distribution parameter value of the first preset distribution model is the distribution parameter value of the first distribution model; and fit a second preset distribution model, to obtain a distribution parameter value of the second preset distribution model; and determine that the second preset distribution model is the second distribution model matching the length of the service packet, and determine that the distribution parameter value of the second preset distribution model is the distribution parameter value of the second distribution model.

In a possible implementation, the first preset distribution model is a Poisson distribution model or a Zeta distribution model, and the second preset distribution model is an exponential distribution model or a Pareto distribution model.

In a possible implementation, the determining unit 302 is specifically configured to: fit the Poisson distribution model by using the quantity of service packets, to obtain a first fitting degree and a distribution parameter value of the Poisson distribution model; fit the Zeta distribution model by using the quantity of service packets, to obtain a second fitting degree and a distribution parameter value of the Zeta distribution model; and if the first fitting degree is greater than the second fitting degree, determine that a distribution model parameter of the Poisson distribution model is the distribution parameter value of the first distribution model matching the quantity of service packets, and the first distribution model is the Poisson distribution model; or if the first fitting degree is not greater than the second fitting degree, determine that the distribution parameter value of the Zeta distribution model is the distribution parameter value of the first distribution model matching the quantity of service packets, and the first distribution model is the Zeta distribution model.

In a possible implementation, the determining unit 302 is specifically configured to:

fit the exponential distribution model by using the length of the service packet, to obtain a third fitting degree and a distribution parameter value of the exponential distribution model;

fit the Pareto distribution model by using the length of the service packet, to obtain a fourth fitting degree and a distribution parameter value of the Pareto distribution model; and if the third fitting degree is greater than the fourth fitting degree, determine that the distribution parameter value of the exponential distribution model is the distribution parameter value of the second distribution model matching the length of the service packet, and the second distribution model is the exponential distribution model; or if the third fitting degree is not greater than the fourth fitting degree, determine that a distribution model parameter of the Pareto distribution model is a distribution model parameter of the second distribution model matching the length of the service packet, and the second distribution model is the Pareto distribution model.

In a possible implementation method, the communications unit 303 is specifically configured to:

send a first report message to the capacity planning apparatus, where the first report message includes an identifier of the first distribution model and an identifier of the second distribution model;

receive a first response message for the first report message from the capacity planning apparatus; and send a second report message to the capacity planning apparatus, where the second report message includes the distribution parameter value of the first distribution model and the distribution parameter value of the second distribution model.

In a possible implementation method, the communications unit 303 is further configured to: receive a first notification message from the capacity planning apparatus, where the first notification message includes a bandwidth control policy; send a first acknowledgment message for the first notification message to the capacity planning apparatus; and receive a second notification message from the capacity planning apparatus, where the second notification message includes a bandwidth value.

The control unit 304 is configured to perform bandwidth control based on the bandwidth value.

In a possible implementation method, the obtaining unit 301 is specifically configured to:

periodically obtain the quantity of service packets in each transmission time interval within the specified duration and the length of the service packet; or periodically obtain a quantity of service packets in each transmission time interval meeting a preset busy-hour condition within the specified duration and the length of the service packet.

In a possible implementation method, the service measurement apparatus is deployed on a terminal, and the capacity planning apparatus is deployed on the base station. The obtaining unit 301 is specifically configured to obtain a quantity of service packets of the terminal in each transmission time interval within specified duration and a length of the service packet of the terminal.

In a possible implementation method, the service measurement apparatus is deployed on the base station, and the capacity planning apparatus is deployed on a mobile edge computing server. The obtaining unit 301 is specifically configured to:

obtain a quantity of service packets of each terminal accessing the base station in each transmission time interval within specified duration and a length of the service packet of the terminal; or obtain a quantity of service packets of the base station in each transmission time interval within the specified duration and a length of the service packet of the base station.

When the apparatus shown in FIG. 3 is the service measurement apparatus, for specific beneficial effects of the capacity planning method performed by the apparatus, refer to the related descriptions of the foregoing method embodiments. Details are not described herein again. It may be understood that the unit in this embodiment of this application may also be referred to as a module. The foregoing units or modules may exist independently, or may be integrated together.

Figure 4:
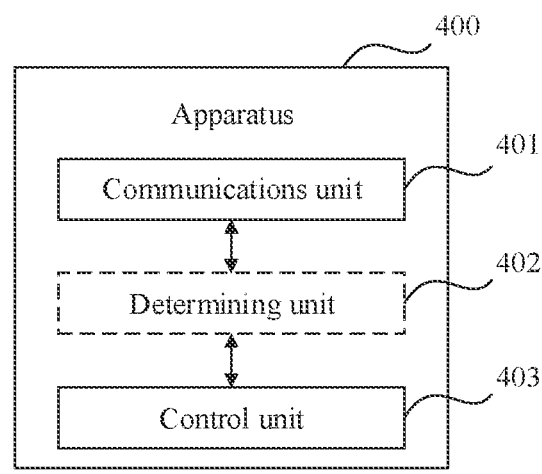
FIG. 4 is a schematic diagram of another apparatus according to this application.

FIG. 4 is a possible example block diagram of an apparatus according to an embodiment of the present invention. The apparatus 400 may exist in a form of software or hardware. The apparatus 400 may include a communications unit 401 and a control unit 403. Optionally, the apparatus 400 may further include a determining unit 402. In an implementation, the communications unit 401 may include a receiving unit and a sending unit. In an implementation, the determining unit 402 and the control unit 403 may be integrated into one processing unit, and the processing unit is configured to control and manage an action of the apparatus 400. The communications unit 401 is configured to support the apparatus 400 in communicating with another network entity.

When the determining unit 402 and the control unit 403 are integrated into one processing unit, the processing unit may be a processor or a controller, for example, may be a CPU, a general purpose processor, a DSP, an ASIC, an FPGA, or another programmable logic device, transistor logic device, hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 401 may be a communications interface, a transceiver, a transceiver circuit, or the like. The communications interface is a general term, and in a specific implementation, the communications interface may include a plurality of interfaces.

The apparatus 400 may be the capacity planning apparatus in any one of the foregoing embodiments, or may be a chip that can be used in the capacity planning apparatus. For example, when the apparatus 300 is the capacity planning apparatus, and the determining unit 402 and the control unit 403 are integrated into one processing unit, the processing unit may be, for example, a processor, the communications unit 401 may be, for example, a transceiver, and the transceiver includes a radio frequency circuit. For example, when the apparatus 400 is the chip that may be used in the capacity planning apparatus, and the determining unit 402 and the control unit 403 are integrated into one processing unit, the processing unit may be, for example, a processor, and the communications unit 401 may be, for example, an input/output interface, a pin, or a circuit.

The communications unit 401 is configured to receive a distribution parameter value of a first distribution model and a distribution parameter value of a second distribution model from a service measurement apparatus, where the first distribution model and the second distribution model are respectively a distribution model matching a quantity of service packets in each transmission time interval within specified duration and a distribution model matching a length of the service packet that are obtained by the service measurement apparatus. The control unit 403 is configured to perform bandwidth control based on the first distribution model, the second distribution model, the distribution parameter value of the first distribution model, and the distribution parameter value of the second distribution model.

In a possible implementation method, the determining unit 402 is configured to determine a user experienced rate distribution model based on the first distribution model, the second distribution model, a downlink transmission rate of a base station, and the transmission time interval; and the control unit 403 is specifically configured to perform bandwidth control based on the user experienced rate distribution model, the distribution parameter value of the first distribution model, the distribution parameter value of the second distribution model, and a quality of service requirement parameter value.

In a possible implementation method, the quality of service requirement parameter value is preset bandwidth utilization; and the control unit 403 is specifically configured to: determine a busy-hour average user experienced rate value based on the user experienced rate distribution model, the distribution parameter value of the first distribution model, the distribution parameter value of the second distribution model, and the preset bandwidth utilization; and perform bandwidth control based on the busy-hour average user experienced rate value.

In a possible implementation method, the first distribution model is a Zeta distribution model, a distribution model parameter of the first distribution model includes s, the second distribution model is a Pareto distribution model, and distribution model parameters of the second distribution model include m and a.

The user experienced rate distribution model is as follows:

$$Pr(R_U > x) \approx \begin{cases} \frac{(1-p_0)\zeta(s-1)m^a}{(R\tau - E[S])\zeta(s)(\alpha-1)}\left(\tau x - \frac{\zeta(s-1)}{\zeta(s)}m + m\right)^{-\alpha+1} & x < R, \\ 0, & x \geq R \end{cases}$$

where Pr( ) is the user experienced rate distribution model, x is an independent variable of a user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packet, τ is the transmission time interval, ζ( ) is a Riemann function, E[S] is an expected value of a quantity of bits that arrive within one transmission time interval, and $p_0$ is a probability that a quantity of service packets that arrive is zero.

The control unit 403 is configured to determine the busy-hour average user experienced rate value according to the following formula:

$$\overline{R}_{busy} = \frac{\left(R\tau - \frac{\zeta(s-1)}{\zeta(s)}m + m\right)^{2-\alpha} - \left(m - \frac{\zeta(s-1)}{\zeta(s)}m\right)^{2-\alpha}}{t(2-\alpha)\left(\varepsilon R\tau - \frac{\zeta(s-1)}{\zeta(s)}m + m\right)},$$

where $\overline{R}_{busy}$ is the busy-hour average user experienced rate value, $\varepsilon$ is the preset bandwidth utilization, and $0 \leq \varepsilon \leq 1$.

In a possible implementation method, the control unit 403 is specifically configured to increase bandwidth if a difference between the busy-hour average user experienced rate value and the downlink transmission rate of the base station is greater than a first difference threshold; or decrease bandwidth if a difference between the busy-hour average user experienced rate value and the downlink transmission rate of the base station is less than a second difference threshold.

In a possible implementation method, the quality of service parameter value is a preset user experienced rate satisfaction degree; and the control unit 403 is specifically configured to: determine a lower limit value of the user experienced rate based on the user experienced rate distribution model, the distribution parameter value of the first distribution model, the distribution parameter value of the second distribution model, and the preset user experienced rate satisfaction degree; and perform bandwidth control based on the lower limit value of the user experienced rate.

In a possible implementation method, the first distribution model is a Zeta distribution model, a distribution model parameter of the first distribution model includes s, the second distribution model is a Pareto distribution model, and distribution model parameters of the second distribution model include m and a.

The user experienced rate distribution model is as follows:

$$Pr(R_U > x) \approx \begin{cases} \frac{(1-p_0)\zeta(s-1)m^{\alpha}}{(R\tau - E[S])\zeta(s)(\alpha-1)}\left(\tau x - \frac{\zeta(s-1)}{\zeta(s)}m + m\right)^{-\alpha+1} & x < R, \\ 0, & x \geq R \end{cases}$$

where Pr( ) is the user experienced rate distribution model, x is an independent variable of the user experienced rate, $R_U$ is the user experienced rate, the user experienced rate at a moment t is $$R_U(t) = \min\left\{R, \frac{Q(t)}{\tau}\right\},$$

R is the downlink transmission rate of the base station, Q( ) is a length of a queue on the base station at the moment t, the queue is used to buffer the service packet, τ is the transmission time interval, $\zeta$( ) is a Riemann function, E[S] is an expected value of a quantity of bits that arrive within one transmission time interval, and $p_0$ is a probability that a quantity of service packets that arrive is zero.

The control unit 403 is configured to determine the lower limit value of the user experienced rate according to the following formula:

$$\frac{(1-p_0)\zeta(s-1)m^{\alpha}}{(R\tau - E[S])\zeta(s)(\alpha-1)}\left(\tau R_{min} - \frac{\zeta(s-1)}{\zeta(s)}m + m\right)^{-\alpha+1} = \eta.$$

where $R_{min}$ is the lower limit value of the user experienced rate, and η is the preset user experienced rate satisfaction degree.

In a possible implementation method, the control unit 403 is specifically configured to increase bandwidth if a difference between the lower limit value of the user experienced rate and the downlink transmission rate of the base station is greater than a third difference threshold; or decrease bandwidth if a difference between the busy-hour average user experienced rate value and the downlink transmission rate of the base station is less than a fourth difference threshold.

In a possible implementation method, the communications unit 401 is further configured to receive identification information of the first distribution model and identification information of the second distribution model from the service measurement apparatus, where the identification information of the first distribution model is used to identify the selected first distribution model, and the identification information of the second distribution model is used to identify the selected second distribution model.

In another possible implementation method, the communications unit 401 is further configured to receive identification information of a service arrival model from the service measurement apparatus, where the identification information of the service arrival model is used to identify a service arrival model corresponding to the selected first distribution model and the selected second distribution model. The determining unit 402 is further configured to determine the selected first distribution model and the selected second distribution model based on the identification information of the service arrival model.

When the apparatus shown in FIG. 4 is the capacity planning apparatus, for specific beneficial effects of the capacity planning method performed by the apparatus, refer to the related descriptions of the foregoing method embodiments. Details are not described herein again. It may be understood that the unit in this embodiment of this application may also be referred to as a module. The foregoing units or modules may exist independently, or may be integrated together.

Figure 5:
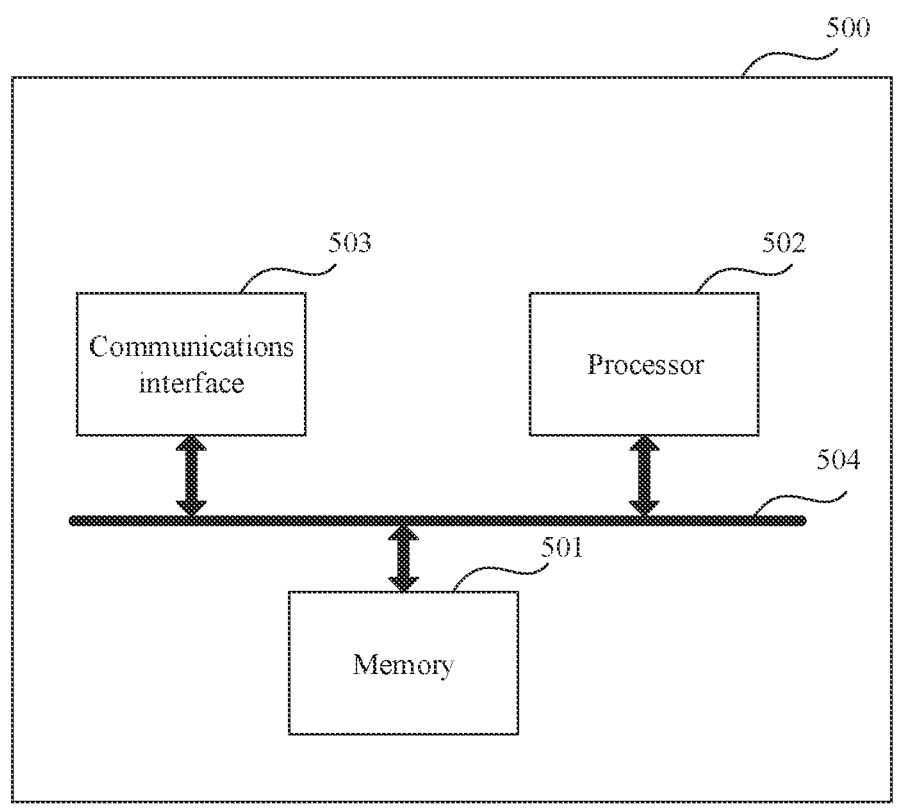
FIG. 5 is a schematic diagram of another apparatus according to this application.

FIG. 5 is a schematic diagram of an apparatus according to this application. The apparatus may be the service measurement apparatus or the capacity planning apparatus in the embodiments of this application, or may be a component that may be used in the service measurement apparatus or the capacity planning apparatus. The apparatus 500 includes a processor 502, a communications interface 503, and a memory 501. Optionally, the apparatus 500 may further include a bus 504. The communications interface 503, the processor 502, and the memory 501 may be connected to each other by using the communication line 504. The communication line 504 may be a peripheral component interconnect (peripheral component interconnect, PCI for short) bus, an extended industry standard architecture (extended industry standard architecture, EISA for short) bus, or the like. The communication line 504 may be classified into an address bus, a data bus, a control bus, and the like. For ease of representation, only one thick line is used to represent the bus in FIG. 5, but this does not mean that there is only one bus or only one type of bus.

The processor 502 may be a CPU, a microprocessor, an ASIC, or one or more integrated circuits configured to control program execution in the solutions of this application.

The communications interface 503 may be any apparatus like a transceiver, and is configured to communicate with another device or a communications network, such as Ethernet, a radio access network (radio access network, RAN), a wireless local area network (wireless local area networks, WLAN), or a wired access network.

The memory 501 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the communications line 504. The memory may alternatively be integrated with the processor.

The memory 501 is configured to store a computer-executable instruction for executing the solutions of this application, and the processor 502 controls the execution. The processor 502 is configured to execute the computer-executable instruction stored in the memory 501, to implement the capacity planning method provided in the foregoing embodiments of this application.

Optionally, the computer-executable instruction in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer distinctions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (Solid State Disk, SSD)), or the like.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal. Alternatively, the processor and the storage medium may also be arranged in different components of the terminal.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A capacity planning method, comprising:
   receiving, by a capacity planning apparatus, a distribution parameter value of a first distribution model and a distribution parameter value of a second distribution model from a service measurement apparatus, wherein the first distribution model and the second distribution model are respectively a distribution model matching a quantity of service packets in each transmission time interval within specified duration and a distribution model matching a length of the service packets that are obtained by the service measurement apparatus; and performing, by the capacity planning apparatus, bandwidth control based on the first distribution model, the second distribution model, the distribution parameter value of the first distribution model, and the distribution parameter value of the second distribution model.

2. The method according to claim 1, wherein the performing, by the capacity planning apparatus, bandwidth control based on the first distribution model, the second distribution model, the distribution parameter value of the first distribution model, and the distribution parameter value of the second distribution model comprises:

determining, by the capacity planning apparatus, a user experienced rate distribution model based on the first distribution model, the second distribution model, a downlink transmission rate of a base station, and the transmission time interval; and performing, by the capacity planning apparatus, the bandwidth control based on the user experienced rate distribution model, the distribution parameter value of the first distribution model, the distribution parameter value of the second distribution model, and a quality of service requirement parameter value.

3. The method according to claim 2, wherein the quality of service requirement parameter value is preset bandwidth utilization; and wherein the performing, by the capacity planning apparatus, the bandwidth control based on the user experienced rate distribution model, the distribution parameter value of the first distribution model, the distribution parameter value of the second distribution model, and a quality of service requirement parameter value comprises:

determining, by the capacity planning apparatus, a busy-hour average user experienced rate value based on the user experienced rate distribution model, the distribution parameter value of the first distribution model, the distribution parameter value of the second distribution model, and the preset bandwidth utilization; and performing, by the capacity planning apparatus, the bandwidth control based on the busy-hour average user experienced rate value.

4. The method according to claim 3, wherein the first distribution model is a Zeta distribution model, a distribution model parameter of the first distribution model includes s, the second distribution model is a Pareto distribution model, and distribution model parameters of the second distribution model include m and $\alpha$;

the user experienced rate distribution model is:

$$Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$

wherein Pr( ) is the user experienced rate distribution model, $R_U$ is a user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packets, T is the transmission time interval, $\zeta(\ )$ is a Riemann function, E[S] is an expected value of a quantity of bits that arrive within one transmission time interval, and $p_0$ is a probability that a quantity of service packets that arrive is zero; and the capacity planning apparatus determines the busy-hour average user experienced rate value according to the following formula:

$$\overline{R}_{busy} = \frac{\left(R\tau - \frac{\zeta(s-1)}{\zeta(s)}m + m\right)^{2-\alpha} - \left(m - \frac{\zeta(s-1)}{\zeta(s)}m\right)^{2-\alpha}}{t(2-\alpha)\left(\varepsilon R\tau - \frac{\zeta(s-1)}{\zeta(s)}m + m\right)^{-\alpha+1}},$$

wherein $\overline{R}_{busy}$ is the busy-hour average user experienced rate value, and $\varepsilon$ is the preset bandwidth utilization, and $0 \leq \varepsilon \leq 1$.

5. The method according to claim 3, wherein the performing, by the capacity planning apparatus, the bandwidth control based on the busy-hour average user experienced rate value comprises:

increasing bandwidth if a difference between the busy-hour average user experienced rate value and the downlink transmission rate of the base station is greater than a first difference threshold; or decreasing bandwidth if a difference between the busy-hour average user experienced rate value and the downlink transmission rate of the base station is less than a second difference threshold.

6. The method according to claim 2, wherein the quality of service requirement parameter value is a preset user experienced rate satisfaction degree; and wherein the performing, by the capacity planning apparatus, the bandwidth control based on the user experienced rate distribution model, the distribution parameter value of the first distribution model, the distribution parameter value of the second distribution model, and a quality of service requirement parameter value comprises:

determining, by the capacity planning apparatus, a lower limit value of the user experienced rate based on the user experienced rate distribution model, the distribution parameter value of the first distribution model, the distribution parameter value of the second distribution model, and the preset user experienced rate satisfaction degree; and performing, by the capacity planning apparatus, the bandwidth control based on the lower limit value of the user experienced rate.

7. The method according to claim 6, wherein the first distribution model is a Zeta distribution model, a distribution model parameter of the first distribution model includes s, the second distribution model is a Pareto distribution model, and distribution model parameters of the second distribution model include m and a;

the user experienced rate distribution model is:

$$Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$

wherein Pr( ) is the user experienced rate distribution model, $R_U$ is the user experienced rate, the user experienced rate at a moment t is $$R_U(t) = \min\left\{R, \frac{Q(t)}{\tau}\right\},$$

R is the downlink transmission rate of the base station, Q(t) is a length of a queue on the base station at the moment t, the queue is used to buffer the service packets, T is the transmission time interval, $\zeta( )$ is a Riemann function, E[S] is an expected value of a quantity of bits that arrive within one transmission time interval, and $p_0$ is a probability that a quantity of service packets that arrive is zero; and the capacity planning apparatus determines the lower limit value of the user experienced rate according to the following formula:

$$\frac{(1-p_0)\zeta(s-1)m^\alpha}{(R\tau - E[S])\zeta(s)(\alpha-1)}\left(\tau R_{min} - \frac{\zeta(s-1)}{\zeta(s)}m + m\right)^{-\alpha+1} = \eta,$$

wherein $R_{min}$ is the lower limit value of the user experienced rate, and η is the preset user experienced rate satisfaction degree.

8. The method according to claim 6, wherein the performing, by the capacity planning apparatus, the bandwidth control based on the lower limit value of the user experienced rate comprises:
increasing bandwidth if a difference between the lower limit value of the user experienced rate and the downlink transmission rate of the base station is greater than a third difference threshold; or
decreasing bandwidth if a difference between a busy-hour average user experienced rate value and the downlink transmission rate of the base station is less than a fourth difference threshold.

9. The method according to claim 1, wherein the method further comprises:
receiving, by the capacity planning apparatus, identification information of the first distribution model and identification information of the second distribution model from the service measurement apparatus, wherein the identification information of the first distribution model is used to identify the first distribution model, and wherein the identification information of the second distribution model is used to identify the second distribution model.

10. The method according to claim 1, wherein the method further comprises:
receiving, by the capacity planning apparatus, identification information of a service arrival model from the service measurement apparatus, wherein the identification information of the service arrival model is used to identify a service arrival model corresponding to the first distribution model and the second distribution model; and
determining, by the capacity planning apparatus, the first distribution model and the second distribution model based on the identification information of the service arrival model.

11. A capacity planning apparatus, comprising:
a transceiver, the transceiver configured to receive a distribution parameter value of a first distribution model and a distribution parameter value of a second distribution model from a service measurement apparatus, wherein the first distribution model and the second distribution model are respectively a distribution model matching a quantity of service packets in each transmission time interval within specified duration and a distribution model matching a length of the service packets that are obtained by the service measurement apparatus;
at least one processor; and
one or more memories coupled to the at least one processor and storing programming instructions for execution by the at least one processor to perform bandwidth control based on the first distribution model, the second distribution model, the distribution parameter value of the first distribution model, and the distribution parameter value of the second distribution model.

12. The apparatus according to claim 11, wherein the programming instructions are for execution by the at least one processor to determine a user experienced rate distribution model based on the first distribution model, the second distribution model, a downlink transmission rate of a base station, and the transmission time interval; and
perform the bandwidth control based on the user experienced rate distribution model, the distribution parameter value of the first distribution model, the distribution parameter value of the second distribution model, and a quality of service requirement parameter value.

* * * * *

UNITED STATES PATENT AND TRADEMARK OFFICE
CERTIFICATE OF CORRECTION

Page 1 of 2

PATENT NO. : 11,736,954 B2
APPLICATION NO. : 17/321104
DATED : August 22, 2023
INVENTOR(S) : Xi Peng et al.

It is certified that error appears in the above-identified patent and that said Letters Patent is hereby corrected as shown below:

In the Claims

In Column 37, In Line 60-62 (approx.), in Claim 4, delete

"$$\Pr(R_U > x) \approx \begin{cases} \dfrac{(1-p_0)\zeta(s-1)m^a}{(R\tau - E[S])\zeta(s)(\alpha-1)}\left(\tau x - \dfrac{\zeta(s-1)}{\zeta(s)}m + m\right)^{-\alpha+1}, & x < R, \\ 0, & x \geq R \end{cases}$$" and insert --$$\Pr(R_U > x) \approx \begin{cases} \dfrac{(1-p_0)\zeta(s-1)m^\alpha}{(R\tau - E[S])\zeta(s)(\alpha-1)}\left(\tau x - \dfrac{\zeta(s-1)}{\zeta(s)}m + m\right)^{-\alpha+1}, & x < R, \\ 0, & x \geq R \end{cases}$$--.

In Column 38, In Line 9 (approx.), in Claim 4, delete "T" and insert -- $\tau$ --.

In Column 38, In Line 18-22 (approx.), in Claim 4, delete

"$$\overline{R}_{busy} = \dfrac{\left(R\tau - \dfrac{\zeta(s-1)}{\zeta(s)}m + m\right)^{2-\alpha} - \left(m - \dfrac{\zeta(s-1)}{\zeta(s)}m\right)^{2-\alpha}}{t(2-\alpha)\left(\varepsilon R\tau - \dfrac{\zeta(s-1)}{\zeta(s)}m + m\right)^{-\alpha+1}},$$" and insert Signed and Sealed this
Nineteenth Day of March, 2024

*Katherine Kelly Vidal*

Katherine Kelly Vidal
*Director of the United States Patent and Trademark Office*

CERTIFICATE OF CORRECTION (continued)
U.S. Pat. No. 11,736,954 B2

"
$$\overline{R}_{busy} = \frac{\left(R\tau - \frac{\zeta(s-1)}{\zeta(s)}m + m\right)^{2-\alpha} - \left(m - \frac{\zeta(s-1)}{\zeta(s)}m\right)^{2-\alpha}}{\tau(2-\alpha)\left(\varepsilon R\tau - \frac{\zeta(s-1)}{\zeta(s)}m + m\right)^{-\alpha+1}},$$
--.

In Column 38, In Line 67, in Claim 7, delete "a;" and insert -- $\alpha$; --.

In Column 39, In Lines 3-6 (approx.), in Claim 7, delete

"
$$\Pr(R_U > x) \approx \begin{cases} \frac{(1-p_0)\zeta(s-1)m^a}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$
" and insert $$\Pr(R_U > x) \approx \begin{cases} \frac{(1-p_0)\zeta(s-1)m^\alpha}{(R\tau - E[S])\zeta(s)(\alpha-1)}\left(\tau x - \frac{\zeta(s-1)}{\zeta(s)}m + m\right)^{-\alpha+1}, & x < R, \\ 0, & x \geq R \end{cases}$$
--.

In Column 39, In Line 19 (approx.), in Claim 7, delete "T" and insert -- $\tau$ --.